(12) United States Patent
Giannini et al.

(10) Patent No.: US 10,926,874 B2
(45) Date of Patent: Feb. 23, 2021

(54) HYBRID PROPULSION VERTICAL TAKE-OFF AND LANDING AIRCRAFT

(71) Applicant: Aurora Flight Sciences Corporation, Manassas, VA (US)

(72) Inventors: Francesco Giannini, Manassas, VA (US); Martin Gomez, Fairfax, VA (US); Daniel Cottrell, Manassas, VA (US); Jean-Charles Lede, Oakton, VA (US); Thomas Roberts, Bristow, VA (US); Carl G. Schaefer, Jr., Woodbridge, VA (US); Dorian Colas, Seattle, WA (US); Brian Whipple, Manassas, VA (US); Timothy Nuhfer, Sterling, VA (US); Herbert E. Hunter, Herndon, VA (US); Jonathan Grohs, Manassas, VA (US); Steve Petullo, Bristow, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 588 days.

(21) Appl. No.: 15/403,818

(22) Filed: Jan. 11, 2017

(65) Prior Publication Data
US 2017/0203839 A1    Jul. 20, 2017

Related U.S. Application Data

(60) Provisional application No. 62/279,380, filed on Jan. 15, 2016.

(51) Int. Cl.
*B64C 29/00*    (2006.01)
*B64C 39/12*    (2006.01)
(Continued)

(52) U.S. Cl.
CPC .......... *B64C 29/0033* (2013.01); *B64C 3/385* (2013.01); *B64C 5/04* (2013.01);
(Continued)

(58) Field of Classification Search
CPC ........ B64C 2201/021; B64C 2201/042; B64C 2201/048; B64C 29/0033; B64C 39/024;
(Continued)

(56) References Cited

U.S. PATENT DOCUMENTS 1,987,788 A * 1/1935 Morton .................. B64C 39/00
                                              244/56
2,767,939 A * 10/1956 Taylor ...................... B60F 5/02
                                              244/2

(Continued)

FOREIGN PATENT DOCUMENTS

DE    1406374       4/1969
JP    S63-97495 A   4/1988
(Continued)

OTHER PUBLICATIONS

International Search Report and Written Opinion dated Mar. 29, 2017, in International application No. PCT/US2017/013105, filed Jan. 12, 2017.

(Continued)

*Primary Examiner* — Medhat Badawi
(74) *Attorney, Agent, or Firm* — Michael Stanley Tomsa; McAndrews, Held & Malloy, Ltd.; Eugene H. Nahm

(57) ABSTRACT

A hybrid propulsion aircraft is described having a distributed electric propulsion system. The distributed electric propulsion system includes a turbo shaft engine that drives one or more generators through a gearbox. The generator provides AC power to a plurality of ducted fans (each being driven by an electric motor). The ducted fans may be integrated with the hybrid propulsion aircraft's wings. The wings can be (Continued)

pivotally attached to the fuselage, thereby allowing for vertical take-off and landing. The design of the hybrid propulsion aircraft mitigates undesirable transient behavior traditionally encountered during a transition from vertical flight to horizontal flight. Moreover, the hybrid propulsion aircraft offers a fast, constant-altitude transition, without requiring a climb or dive to transition. It also offers increased efficiency in both hover and forward flight versus other VTOL aircraft and a higher forward max speed than traditional rotorcraft.

20 Claims, 20 Drawing Sheets

(51) Int. Cl.
*B64D 27/24* (2006.01)
*B64C 3/38* (2006.01)
*B64C 5/04* (2006.01)
*B64C 5/16* (2006.01)
*B64D 29/02* (2006.01)
B64D 27/02 (2006.01)
B64C 39/02 (2006.01)

(52) U.S. Cl.
CPC ........... *B64C 5/16* (2013.01); *B64C 39/12* (2013.01); *B64D 27/24* (2013.01); *B64D 29/02* (2013.01); *B64C 39/024* (2013.01); *B64C 2201/021* (2013.01); *B64C 2201/042* (2013.01); *B64C 2201/048* (2013.01); *B64D 2027/026* (2013.01); *Y02T 50/10* (2013.01); *Y02T 50/40* (2013.01); *Y02T 50/60* (2013.01)

(58) Field of Classification Search
CPC .......... B64C 39/12; B64C 3/385; B64C 5/04; B64C 5/16; B64D 2027/026; B64D 27/24; B64D 29/00; Y02T 50/14; Y02T 50/44; Y02T 50/64
See application file for complete search history.

(56) References Cited

U.S. PATENT DOCUMENTS

| | | | | |
|---|---|---|---|---|
| 2,929,580 A * | 3/1960 | Ciolkosz | B64C 29/0025 | 244/12.5 |
| 2,936,968 A * | 5/1960 | Mazzitelli | B64C 29/0033 | 244/7 C |
| 2,961,189 A * | 11/1960 | Doak | B64C 29/0033 | 244/12.4 |
| 3,066,741 A * | 12/1962 | Barnes | B64C 11/50 | 361/244 |
| 3,123,321 A * | 3/1964 | Custer | B64C 39/066 | 244/12.6 |
| 3,161,374 A * | 12/1964 | Allred | B64C 29/0025 | 244/12.3 |
| 3,181,810 A * | 5/1965 | Olson | B64C 29/0033 | 244/66 |
| 3,212,731 A * | 10/1965 | Kappus | B64C 29/0025 | 244/12.5 |
| 3,220,669 A * | 11/1965 | Manns | B64C 29/0025 | 244/12.3 |
| 3,291,242 A * | 12/1966 | Tinajero | B60V 1/04 | 180/116 |
| 3,298,633 A * | 1/1967 | Dastoli | B64C 29/0033 | 244/2 |
| 3,312,426 A * | 4/1967 | Fowler | B64C 23/005 | 244/12.5 |
| 3,335,977 A * | 8/1967 | Meditz | B64C 3/42 | 244/12.4 |
| 3,388,878 A * | 6/1968 | Peterson | B64C 29/0033 | 244/12.3 |
| 3,397,854 A * | 8/1968 | Reyle | B64C 11/00 | 244/106 |
| 3,499,620 A * | 3/1970 | Sturm | B64C 29/0033 | 244/12.4 |
| 3,618,875 A * | 11/1971 | Kappus | B64C 29/0025 | 244/12.3 |
| 3,762,667 A * | 10/1973 | Pender | B64C 29/0033 | 244/17.19 |
| 4,371,132 A * | 2/1983 | Woodward | F02K 1/72 | 244/110 B |
| 4,469,294 A * | 9/1984 | Clifton | B64C 29/0025 | 244/10 |
| 4,488,692 A * | 12/1984 | Eickmann | B64C 11/28 | 244/55 |
| 4,709,880 A * | 12/1987 | Bradfield | B64C 29/0066 | 244/12.5 |
| 4,789,115 A * | 12/1988 | Koutsoupidis | B64C 27/26 | 244/215 |
| 4,828,203 A * | 5/1989 | Clifton | B64C 29/0025 | 244/12.3 |
| 4,900,226 A * | 2/1990 | de Vries | B64C 11/50 | 416/34 |
| 5,141,176 A * | 8/1992 | Kress | B64C 29/0033 | 244/48 |
| 5,209,428 A * | 5/1993 | Bevilaqua | B64C 29/0025 | 244/12.3 |
| 5,312,069 A * | 5/1994 | Bollinger | F02K 3/068 | 244/12.3 |
| 5,320,305 A * | 6/1994 | Oatway | B64C 29/0025 | 244/12.3 |
| 5,542,625 A * | 8/1996 | Burhans, Jr. | B64C 3/16 | 244/45 A |
| 5,597,137 A * | 1/1997 | Skoglun | B64C 29/0033 | 244/12.4 |
| 5,758,844 A * | 6/1998 | Cummings | B64C 29/0033 | 244/12.4 |
| 5,765,777 A * | 6/1998 | Schmittle | B64C 3/385 | 244/17.25 |
| 5,823,468 A * | 10/1998 | Bothe | B64B 1/08 | 244/2 |
| 5,934,607 A * | 8/1999 | Rising | B64C 23/04 | 244/1 N |
| 6,023,134 A * | 2/2000 | Carl | F02C 7/32 | 290/30 A |
| 6,036,142 A * | 3/2000 | Yates | B64C 15/02 | 239/265.19 |
| 6,729,575 B2 * | 5/2004 | Bevilaqua | B64C 29/0066 | 244/12.3 |
| 6,860,449 B1 * | 3/2005 | Chen | B64B 1/06 | 244/12.1 |
| 6,886,776 B2 * | 5/2005 | Wagner | B64C 3/56 | 244/12.4 |
| 7,104,499 B1 * | 9/2006 | Arata | B64C 9/38 | 244/12.3 |
| 7,114,685 B1 * | 10/2006 | Schulein | B64C 3/10 | 244/199.1 |
| 7,249,734 B2 * | 7/2007 | Yurkovich | B64C 3/40 | 244/46 |
| 7,410,122 B2 * | 8/2008 | Robbins | B64C 39/024 | 244/12.3 |
| 7,412,825 B2 * | 8/2008 | Muylaert | B64C 29/0066 | 244/12.3 |
| 7,520,466 B2 * | 4/2009 | Bostan | B64C 3/385 | 244/93 |
| 7,665,689 B2 * | 2/2010 | McComb | B64C 15/02 | 244/12.3 |
| 7,735,774 B2 * | 6/2010 | Lugg | B64C 29/0066 | 244/12.1 |
| 7,789,342 B2 * | 9/2010 | Yoeli | B60V 1/06 | 244/12.3 |
| 7,806,362 B2 * | 10/2010 | Yoeli | B60V 1/043 | 244/23 A |
| 7,857,253 B2 * | 12/2010 | Yoeli | B64C 1/1415 | 244/12.3 |

(56) References Cited

U.S. PATENT DOCUMENTS

| | | | | |
|---|---|---|---|---|
| 7,857,254 B2* | 12/2010 | Parks | | B64C 15/00 244/12.4 |
| 7,866,598 B2* | 1/2011 | Waide | | B64C 29/0033 192/48.5 |
| 8,016,226 B1* | 9/2011 | Wood | | B64C 29/0033 244/12.4 |
| 8,128,019 B2* | 3/2012 | Annati | | B64C 27/20 244/12.3 |
| 8,336,806 B2* | 12/2012 | Dierksmeier | | B64C 29/0025 244/12.3 |
| 8,408,490 B2* | 4/2013 | McDonnell | | B64C 30/00 244/45 R |
| 8,616,492 B2* | 12/2013 | Oliver | | B64C 29/0033 244/12.4 |
| 8,636,241 B2 | 1/2014 | Lugg et al. | | |
| 8,752,788 B2* | 6/2014 | Tuval | | B64C 3/32 244/34 A |
| 8,757,538 B2* | 6/2014 | Seifert | | B64C 3/10 244/46 |
| 8,800,912 B2* | 8/2014 | Oliver | | B64C 29/0033 244/12.4 |
| 8,915,467 B2* | 12/2014 | Narasimha | | B64C 3/00 244/35 R |
| 8,937,254 B2* | 1/2015 | Wen | | B64C 3/185 174/113 R |
| 9,010,693 B1* | 4/2015 | Barbieri | | B64C 39/024 244/218 |
| 9,132,915 B2* | 9/2015 | Zhu | | B64C 29/0025 |
| 9,227,721 B1* | 1/2016 | Nguyen | | B64C 9/14 |
| 9,278,753 B2* | 3/2016 | Reckzeh | | B64C 21/02 |
| 9,327,822 B1* | 5/2016 | Melton | | B64C 3/385 |
| 9,481,457 B2* | 11/2016 | Alber | | B64C 39/024 |
| 9,834,305 B2* | 12/2017 | Taylor | | B64C 39/024 |
| 9,908,613 B2* | 3/2018 | Fischer | | B64C 39/12 |
| 9,950,801 B2* | 4/2018 | Viala | | B64D 27/24 |
| 9,975,631 B1* | 5/2018 | McLaren | | B64C 29/0033 |
| 2003/0080242 A1* | 5/2003 | Kawai | | B64C 11/001 244/12.4 |
| 2005/0133662 A1* | 6/2005 | Magre | | B64C 29/0033 244/7 R |
| 2005/0230519 A1* | 10/2005 | Hurley | | B64C 29/0033 244/7 C |
| 2005/0230524 A1* | 10/2005 | Ishiba | | B60F 5/02 244/23 A |
| 2007/0126292 A1* | 6/2007 | Lugg | | F01D 5/03 310/11 |
| 2009/0294573 A1* | 12/2009 | Wilson | | B64C 39/024 244/2 |
| 2010/0237165 A1* | 9/2010 | Krueger | | B63H 25/46 239/11 |
| 2011/0042510 A1* | 2/2011 | Bevirt | | B64C 29/0033 244/12.4 |
| 2011/0303795 A1* | 12/2011 | Oliver | | B64C 29/0033 244/7 R |
| 2012/0043413 A1* | 2/2012 | Smith | | B64C 29/0033 244/12.4 |
| 2012/0091257 A1* | 4/2012 | Wolff | | B64C 29/0033 244/12.4 |
| 2012/0234968 A1* | 9/2012 | Smith | | B64C 29/0033 244/12.3 |
| 2012/0280091 A1* | 11/2012 | Saiz | | B64C 27/26 244/7 R |
| 2013/0062455 A1* | 3/2013 | Lugg | | B64C 29/0025 244/12.3 |
| 2014/0060004 A1* | 3/2014 | Mast | | B64C 27/28 60/204 |
| 2014/0158816 A1* | 6/2014 | DeLorean | | B64C 29/0033 244/12.4 |
| 2014/0338352 A1* | 11/2014 | Edwards | | F02C 3/113 60/774 |
| 2014/0339372 A1* | 11/2014 | Dekel | | B64C 29/0033 244/7 R |
| 2015/0021430 A1* | 1/2015 | Paduano | | B64C 13/16 244/47 |
| 2015/0274289 A1* | 10/2015 | Newman | | B64C 27/26 244/12.4 |
| 2015/0314865 A1* | 11/2015 | Bermond | | B64C 29/0033 244/17.27 |
| 2016/0023754 A1* | 1/2016 | Wiegand | | B64C 11/001 244/7 R |
| 2016/0040595 A1* | 2/2016 | Devine | | F02C 7/042 415/2.1 |
| 2016/0167780 A1* | 6/2016 | Giovenga | | B64C 3/385 244/7 R |
| 2016/0214710 A1* | 7/2016 | Brody | | B64C 29/0033 |
| 2016/0311529 A1* | 10/2016 | Brotherton-Ratcliffe | | B64C 27/20 |
| 2016/0333822 A1* | 11/2016 | Roberts | | F02K 1/72 |
| 2016/0347447 A1* | 12/2016 | Judas | | B64C 29/0033 |
| 2016/0355257 A1* | 12/2016 | Chappell | | B64C 39/024 |
| 2017/0057631 A1* | 3/2017 | Fredericks | | B64C 25/52 |
| 2017/0121029 A1* | 5/2017 | Blyth | | B64C 29/0033 |
| 2017/0158321 A1* | 6/2017 | Mia | | B64C 29/0025 |
| 2017/0159674 A1* | 6/2017 | Maciolek | | B64C 7/02 |
| 2017/0197709 A1* | 7/2017 | Fink | | B64C 27/26 |
| 2017/0197711 A1* | 7/2017 | King | | B64C 29/0025 |
| 2017/0197719 A1* | 7/2017 | Kwon | | B64D 9/00 |
| 2017/0234447 A1* | 8/2017 | Jennings | | F02C 3/04 251/11 |
| 2017/0240274 A1* | 8/2017 | Regev | | B64C 29/0033 |
| 2017/0327219 A1* | 11/2017 | Alber | | B64C 29/02 |
| 2018/0086448 A1* | 3/2018 | Kroo | | B64C 29/0033 |
| 2019/0023390 A1* | 1/2019 | Murrow | | B64D 31/06 |

FOREIGN PATENT DOCUMENTS

| | | |
|---|---|---|
| JP | H11-513635 A | 11/1999 |
| WO | WO97/15492 | 5/1997 |
| WO | WO2012/102698 | 8/2012 |

OTHER PUBLICATIONS

Aurora Wins DARPA VTOL X-Plane Program Contract, Feb. 4, 2014: http://www.aurora.aero/wp-content/uploads/2015/11/DARPA-VXP-for-customer-approval-vfinal.pdf.
Aurora Awarded Funding to Continue Development of DARPA VTOL X-Plane Program, Sep. 30, 2014: http://www.aurora.aero/wp-content/uploads/press_release/APR-320%20VTOL%20XP.pdf.
The Notice of Reasons for Rejection for Japanese Application No. 2018-537536, dated Nov. 10, 2020, and translation (12 pages).

* cited by examiner

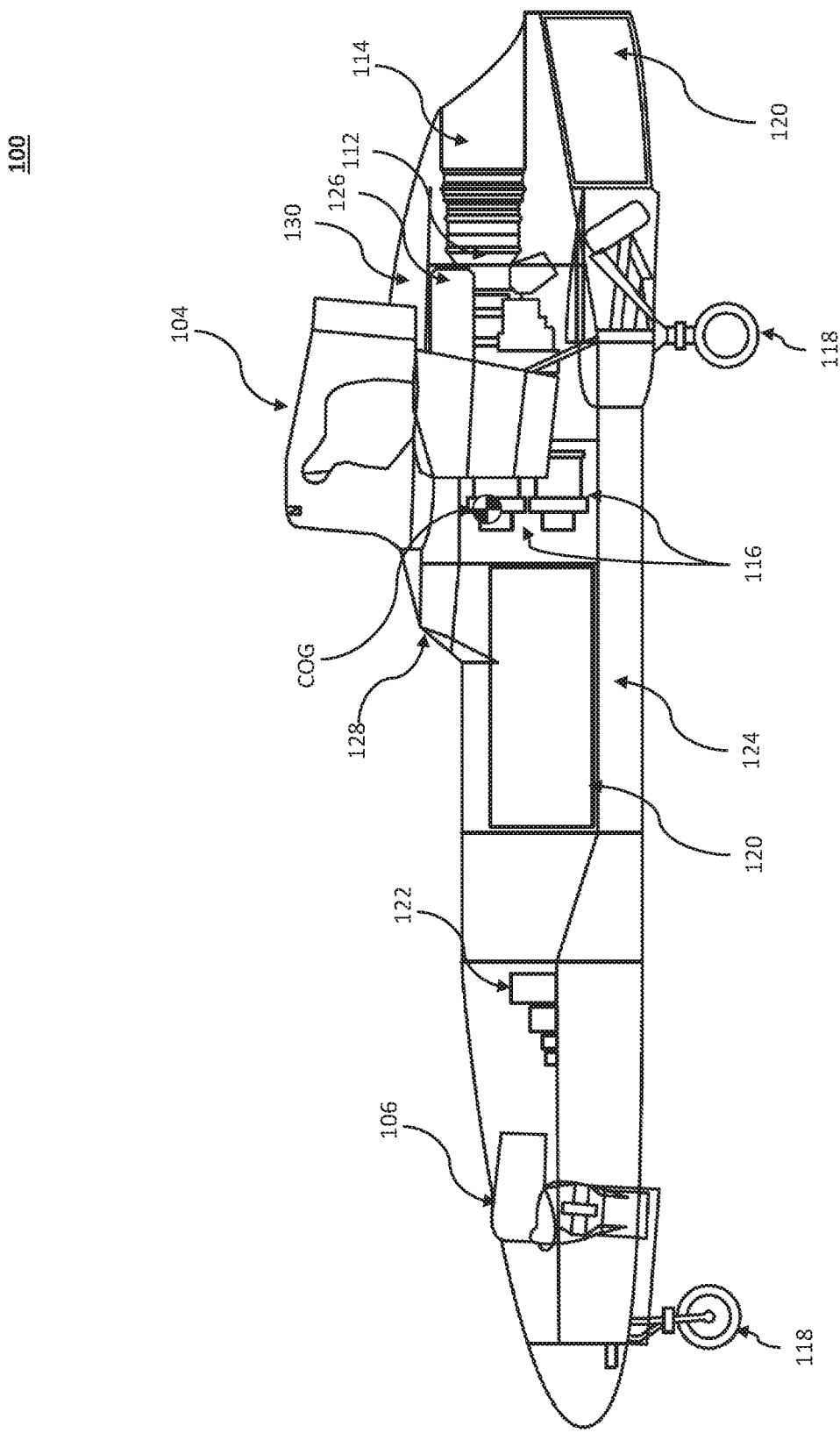

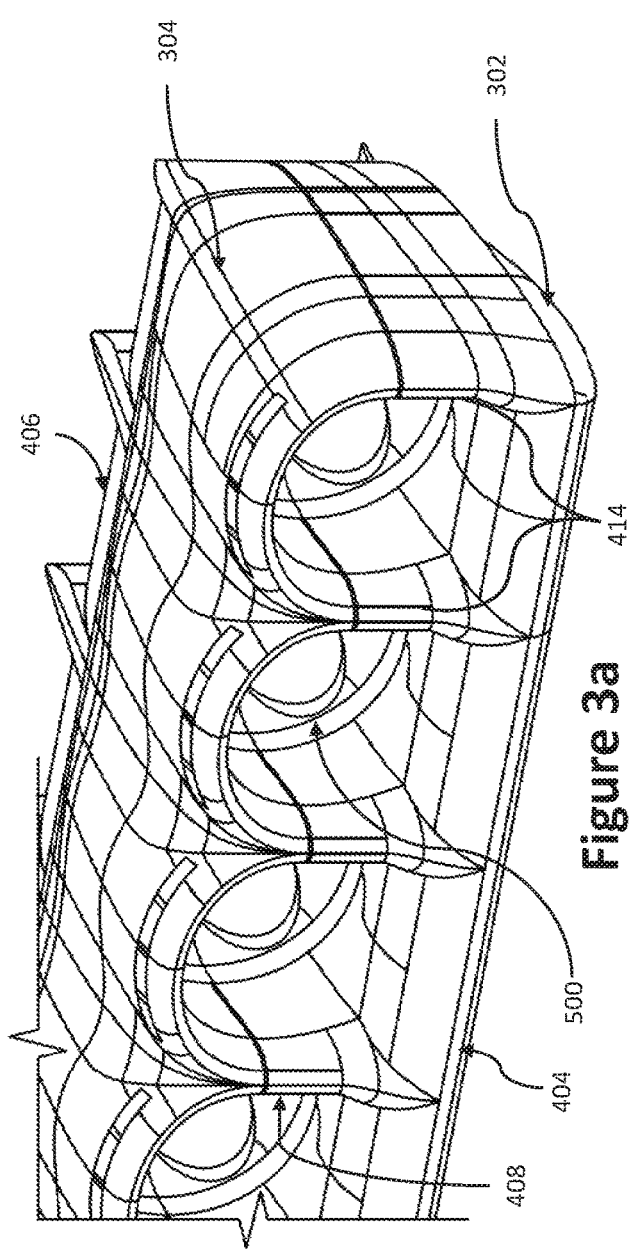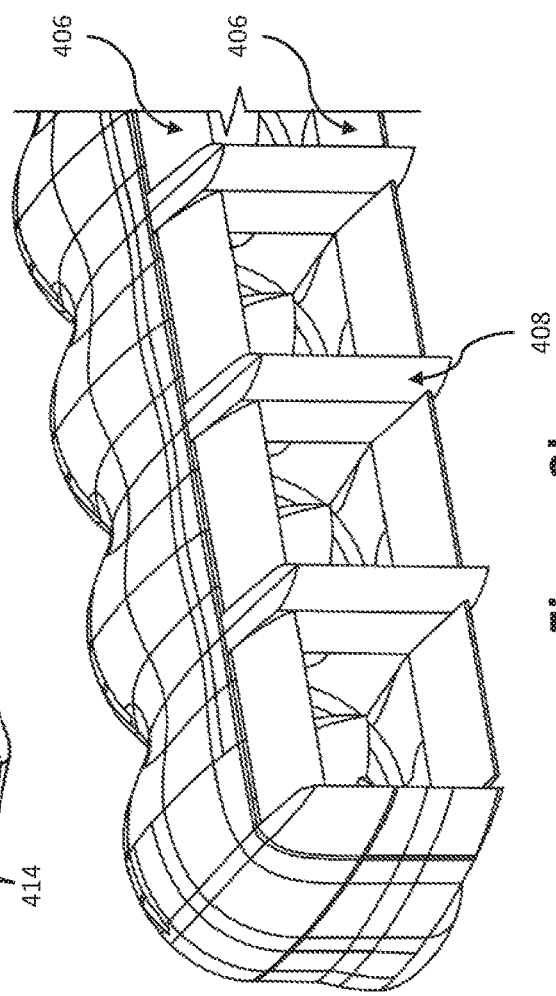
Figure 3a
Figure 3b

HYBRID PROPULSION VERTICAL TAKE-OFF AND LANDING AIRCRAFT

CROSS-REFERENCE TO RELATED APPLICATION

The present application claims the benefit under 35 U.S.C. § 119(e) of U.S. Provisional Patent Application Ser. No. 62/279,380 titled "Hybrid Propulsion Vertical Take-Off and Landing Aircraft," filed Jan. 15, 2016, the contents of which are hereby incorporated by reference.

STATEMENT OF GOVERNMENT INTEREST

This invention was made with government support under Contract Number: HR0011-14-C-0014 awarded by the Defense Advanced Research Projects Agency (DARPA). The government has certain rights in the invention.

TECHNICAL FIELD

The present invention relates to the field of vertical takeoff and landing aircraft; more particularly, to a hybrid propulsion aircraft; even more particularly, to a hybrid propulsion aircraft having a tilt-wing configuration. The vertical takeoff and landing aircraft may be manned or unmanned.

BACKGROUND

There has long been a need for vertical take-off and landing ("VTOL") vehicles that are capable of being deployed from confined spaces. In fact, many situations favor vehicles, specifically unmanned aerial vehicles ("UAVs"), which can launch and recover vertically without requiring complex or heavy ground support equipment. The ability to organically deploy a UAV is particularly attractive in situations where a runway is unavailable or inaccessible. Until recently, however, the efficiency penalty associated with incorporating a hover phase of flight, the complexity associated with transition from vertical (e.g., hover) to horizontal flight (e.g., forward flight, or cruise), and the necessity to reduce or eliminate exposure of ground personnel to exposed high-speed rotors have hindered attempts to develop efficient VTOL UAVs.

In recent years, however, advancements have been made to improve overall efficiency of VTOL aircraft and VTOL UAVs. For example, commonly owned U.S. Pat. No. 7,857,254, to Robert Parks, discloses a short/vertical take-off and landing aircraft that stores required take-off power in the form of primarily an electric fan engine, and secondarily in the form of an internal combustion engine. Similarly, commonly owned U.S. Patent Publication No. 2015/0021430, to James Donald Paduano et al., discloses a long-endurance, high-aspect ratio VTOL UAV that may be launched from confined spaces.

Despite the forgoing, however, a need exists for a further improved VTOL aircraft, such as a hybrid propulsion aircraft, which may employ a tilt-wing configuration. The hybrid propulsion aircraft, as disclosed herein, may be used for land-based operations, ship-board operations, operations requiring short or long range deployment, as well as commercial applications.

SUMMARY OF THE INVENTION

The present invention is directed to a hybrid propulsion aircraft; even more particularly, to a hybrid propulsion aircraft having a tilt-wing configuration. The vertical takeoff and landing aircraft may be manned or unmanned.

According to a first aspect, a hybrid propulsion vertical take-off and landing (VTOL) aerial vehicle comprises: a fuselage; an engine, such as a turbo shaft engine, operatively coupled with a plurality of generators, the engine and the plurality of generators being positioned within the fuselage; a primary wing set, the primary wing set comprising a first plurality of integrated ducted fans, each of said first plurality of integrated ducted fans being operatively coupled with at least one of said plurality of generators; and a canard wing set, the canard wing set comprising a second plurality of integrated ducted fans, each of said second plurality of integrated ducted fans being operatively coupled with at least one of said plurality of generators, wherein the primary wing set or the canard wing set is pivotally attached to the fuselage.

According to a second aspect, a hybrid propulsion vertical take-off and landing (VTOL) aerial vehicle comprises: a fuselage; an engine operatively coupled with one or more generators to generate electric power, the engine and the one or more generators being positioned within the fuselage; a primary wing set having a first plurality of integrated ducted fans to collectively generate a first aggregate thrust, each of said first plurality of integrated ducted fans driven by an electric fan motor operatively coupled with at least one of said one or more generators; and a canard wing set having a second plurality of integrated ducted fans to collectively generate a second aggregate thrust, each of said second plurality of integrated ducted fans driven by an electric fan motor operatively coupled with at least one of said one or more generators, wherein the hybrid propulsion VTOL aerial vehicle is operable in a hover mode and a horizontal flight mode, wherein each of the canard wing set and the primary wing set are configured to transition between a vertical wing configuration in the hover mode and a horizontal wing configuration in the horizontal flight mode.

In certain aspects, the canard wing set and the primary wing set are pivotally attached to the fuselage.

In certain aspects, said canard wing set and said primary wing set provide both lift and propulsion.

In certain aspects, at least one of the primary wing set and the canard wing set are anhedral.

In certain aspects, one or more of said first or second plurality of integrated ducted fans comprises an adjustable thrust nozzle, which may be independently controllable.

In certain aspects, each of said first plurality of integrated ducted fans and said second plurality of integrated ducted fans comprises an adjustable thrust nozzle, which may be independently controllable.

In certain aspects, each of said first plurality of integrated ducted fans and said second plurality of integrated ducted fans are distributed evenly along the primary wing set's wingspan.

In certain aspects, the first plurality of integrated ducted fans are evenly distributed along the primary wing set's wingspan.

In certain aspects, the second plurality of integrated ducted fans are evenly distributed along the canard wing set's wingspan.

In certain aspects, the one or more generators includes a first generator operably coupled with: (1) two of said first plurality of integrated ducted fans, each being positioned on opposite sides of the fuselage; and (2) two of said second plurality of integrated ducted fans, each being positioned on opposite sides of the fuselage.

In certain aspects, the one or more generators includes the first generator and a second generator, the second generator operably coupled with: (1) two of said first plurality of integrated ducted fans, each being positioned on opposite sides of the fuselage; and (2) two of said second plurality of integrated ducted fans, each being positioned on opposite sides of the fuselage.

In certain aspects, the one or more generators includes the first generator, the second generator, and a third generator, the third generator operably coupled with: (1) two of said first plurality of integrated ducted fans, each being positioned on opposite sides of the fuselage; and (2) two of said second plurality of integrated ducted fans, each being positioned on opposite sides of the fuselage.

In certain aspects, the hybrid propulsion VTOL aerial vehicle further comprises a gearbox, wherein said engine and each of said one or more generators are operably coupled with the gearbox without an intervening drive shaft.

In certain aspects, each of said first and second plurality of integrated ducted fans comprises a duct chamber having a thrust assembly positioned therein, the duct chamber having an upper leading edge with one or more airflow slots to guide airflow through the upper leading edge and into the duct chamber.

In certain aspects, the ratio of the duct chamber's length to diameter is between 1.5 and 2.5.

In certain aspects, each of said first and second plurality of integrated ducted fans comprises (1) a fan having a plurality of fan blades and (2) a pitch control mechanism, the pitch control mechanism being configured to adjust a pitch of each of said plurality of fan blades.

In certain aspects, at least one of said first or second plurality of integrated ducted fans comprises (1) a fan having a plurality of fan blades and (2) a pitch control mechanism, the pitch control mechanism being configured to adjust a pitch of each of said plurality of fan blades.

In certain aspects, each of said plurality of fan blades comprises a pitch arm, each pitch arm being coupled with a translating pitch cone, wherein the translating pitch cone is configured to travel laterally perpendicular with regard to a plane defined by the fan's rotation, thereby actuating each pitch arm.

In certain aspects, the hybrid propulsion VTOL aerial vehicle further comprises a flight control unit to detect whether a first electric fan motor of a first integrated ducted fan is out of synchronization with a second electric fan motor of a second integrated ducted fan using a torque detection technique or by comparing at least one of a phase or a waveform of a voltage signal and a current signal. For example, a synchronization monitoring system may be provided that prevents a ducted fan's motor from falling out of synchronization with the other fan motors and/or generator.

In certain aspects, the hybrid propulsion VTOL aerial vehicle further comprises a flight control unit to provide feedback pertaining to an operating parameter of at least one of said first plurality of integrated ducted fans or said second plurality of integrated ducted fans to a generator controller operatively coupled with one or more of said one or more generators.

In certain aspects, each electric fan motor operates at a constant motor speed during transition between said hover mode and said horizontal flight mode.

In certain aspects, each electric fan motor and/or each of the one or more generators operate at a constant rotation per minute (RPM) during transition between said hover mode and said horizontal flight mode.

In certain aspects, each electric fan motor operates at a constant frequency during transition between said hover mode and said horizontal flight mode.

In certain aspects, the electric power generated by said one or more generators is supplied to the first plurality of integrated ducted fans and the second plurality of integrated ducted fans without converting or inverting said electric power. For example, the voltage level and/or the power level from the one or more generators may be maintained at the same level.

In certain aspects, the electric power generated by said one or more generators is filtered to remove noise and is supplied to the first plurality of integrated ducted fans and the second plurality of integrated ducted fans via a Litz wire or a metal tube having a varying diameter.

In certain aspects, the primary wing set is modular such that one or more of the first plurality of integrated ducted fans is a ducted fan module configured to removably couple with an adjacent integrated ducted fan. For example, the ducted fan module may removably couple with an adjacent integrated ducted fan at a separator plate.

DESCRIPTION OF THE DRAWINGS

These and other advantages of the present invention will be readily understood with the reference to the following specifications and attached drawings wherein:

FIG. 1b illustrates a side view of the hybrid propulsion aircraft of FIG. 1a.

FIG. 1c illustrates a top plan view of the hybrid propulsion aircraft of FIG. 1a.

FIGS. 1d and 1e illustrate, respectively, rear and front isometric views of the hybrid propulsion aircraft of FIG. 1a.

FIGS. 1f and 1g illustrate side views of the hybrid propulsion aircraft with body panel portions omitted.

FIGS. 3a and 3b illustrate, respectively, front and rear isometric views of a ducted fan arrangement.

DETAILED DESCRIPTION

Figure 1A:
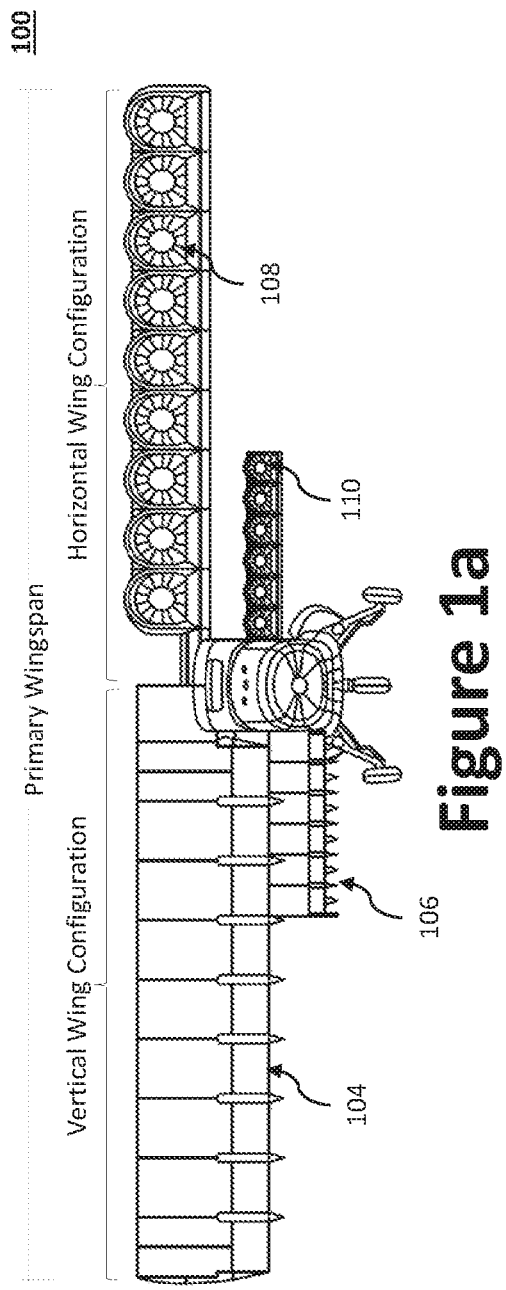
FIG. 1a illustrates a front view of an example hybrid propulsion aircraft.

Preferred embodiments of the present invention will be described hereinbelow with reference to the accompanying drawings. In the following description, well-known functions or constructions are not described in detail because they may obscure the invention in unnecessary detail. For this disclosure, the following terms and definitions shall apply.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.). As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations As used herein, the terms "aerial vehicle" and "aircraft" refer to a machine capable of flight, including, but not limited to, traditional aircraft and VTOL aircraft. VTOL aircraft may include both fixed-wing aircraft (e.g., Harrier jets), rotorcraft (e.g., helicopters), and/or tilt-rotor/tilt-wing aircraft.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, FML, etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

Disclosed herein is a hybrid propulsion aircraft 100 having increased maneuverable and agility, particularly in horizontal flight, where it has demonstrated roll and pitch rates akin to a helicopter. The hybrid propulsion aircraft 100 is hybrid electric in that it generates propulsion using a plurality of independently controllable alternating current (AC) motor-driven ducted fans, which receive AC power from one or more turbine-driven generators, for example, as illustrated herein, three generators. The thrust from the ducted fans may be independently controlled using variable pitch fans (e.g., via a pitch control mechanism 520), while the electric motors are spun at same speed and synchronized with a generator coupled thereto. The hybrid propulsion aircraft 100 may further employ a tilt-wing and adjustable thrust nozzles to direct and control the thrust generated by each of the ducted fans.

The hybrid propulsion aircraft's 100 design is advantageous in numerous ways. First, it allows for vertical take-off and landing, while mitigating undesirable transient behaviors during transition from vertical flight (i.e., hover) to horizontal flight. That is, the hybrid propulsion aircraft 100 provides a fast and constant-altitude transition, which does not require that the hybrid propulsion aircraft 100 climb or dive in order to transition. Second, the aircraft is trimmable at any point in the airspeed range, without any unstable regimes or thrust deficits during transition. Third, the hybrid propulsion aircraft 100 is highly efficient in both vertical and horizontal flight, while traditional VTOL aircraft are much less in one or the other. Fourth, the hybrid propulsion aircraft 100 does not employ exposed rotors (e.g., fan blades 512), which can threaten the safety of passengers, ground crew, or equipment. Rather, the hybrid propulsion aircraft's 100 fan blades 512 and thrust assemblies 500 are shrouded by, for example, the wing structure, or portion thereof. Fifth, the hybrid propulsion aircraft's 100 wake is cold, and is at the extremes of the aircraft. Sixth, the payload bay and cockpit are near the ground, thereby providing increased accessibility. Finally, the hybrid propulsion aircraft 100 provides large amounts of payload power at cruise when propulsive power draws are minimal. That is, by using hybrid electric power, although most of the electric power may be required during vertical flight, a significant amount of excess power is available during horizontal flight. For example, in certain aspects, only about 35% of the power generated during horizontal flight is needed to sustain horizontal flight, therefore leaving 65% of the power for non-flight-related power needs, such as powering payload equipment.

Figure 1B:
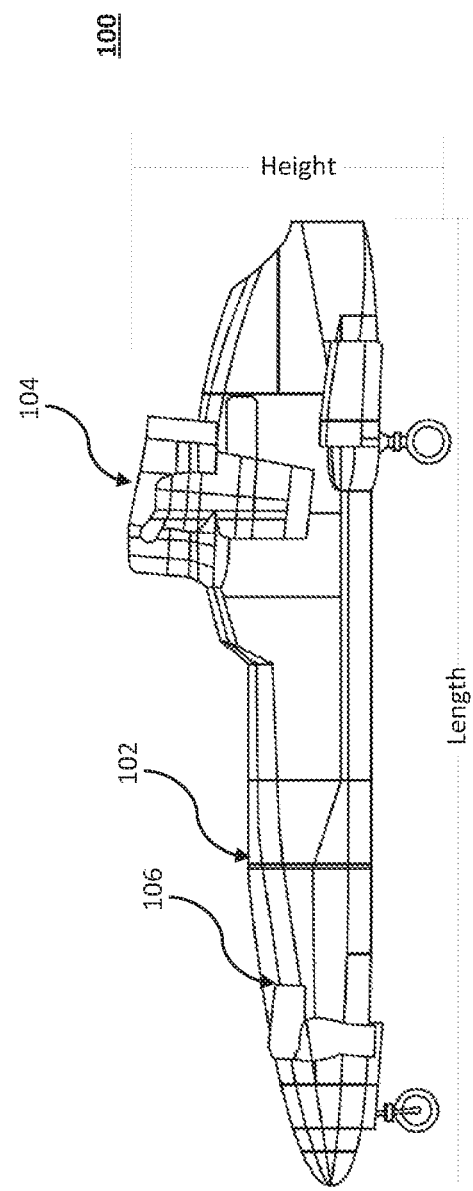
Figure 1C:
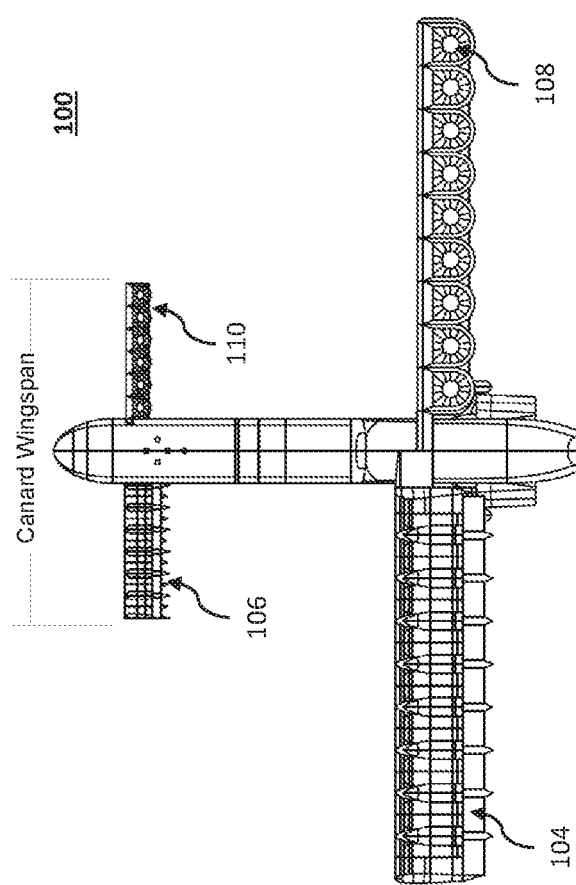
Figure 1E:
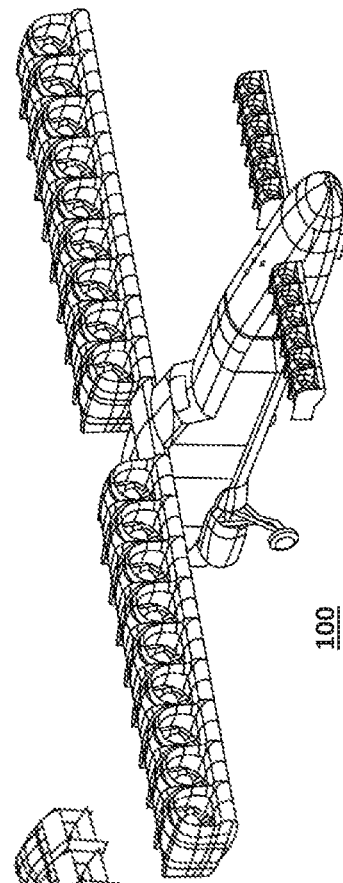
Figure 1D:
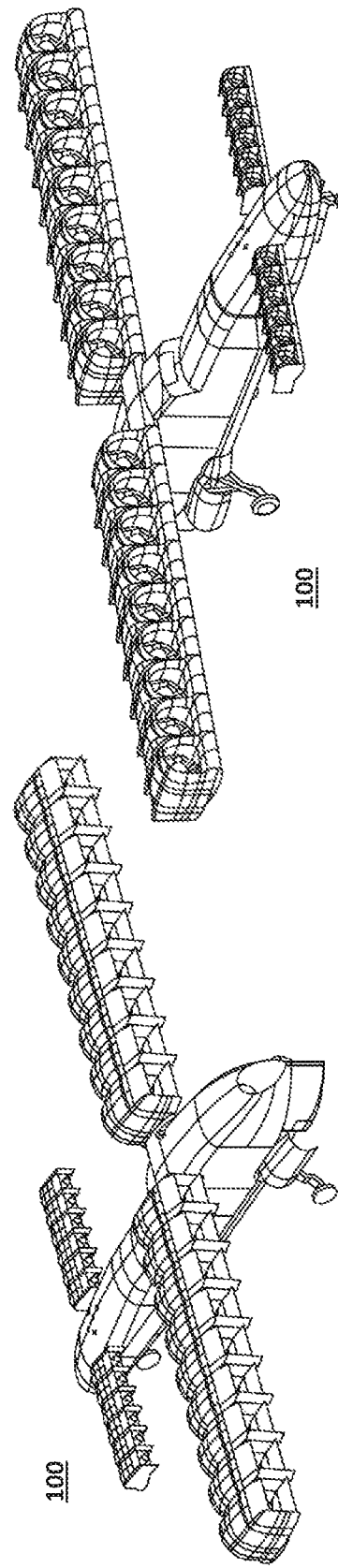
Figure 1G:
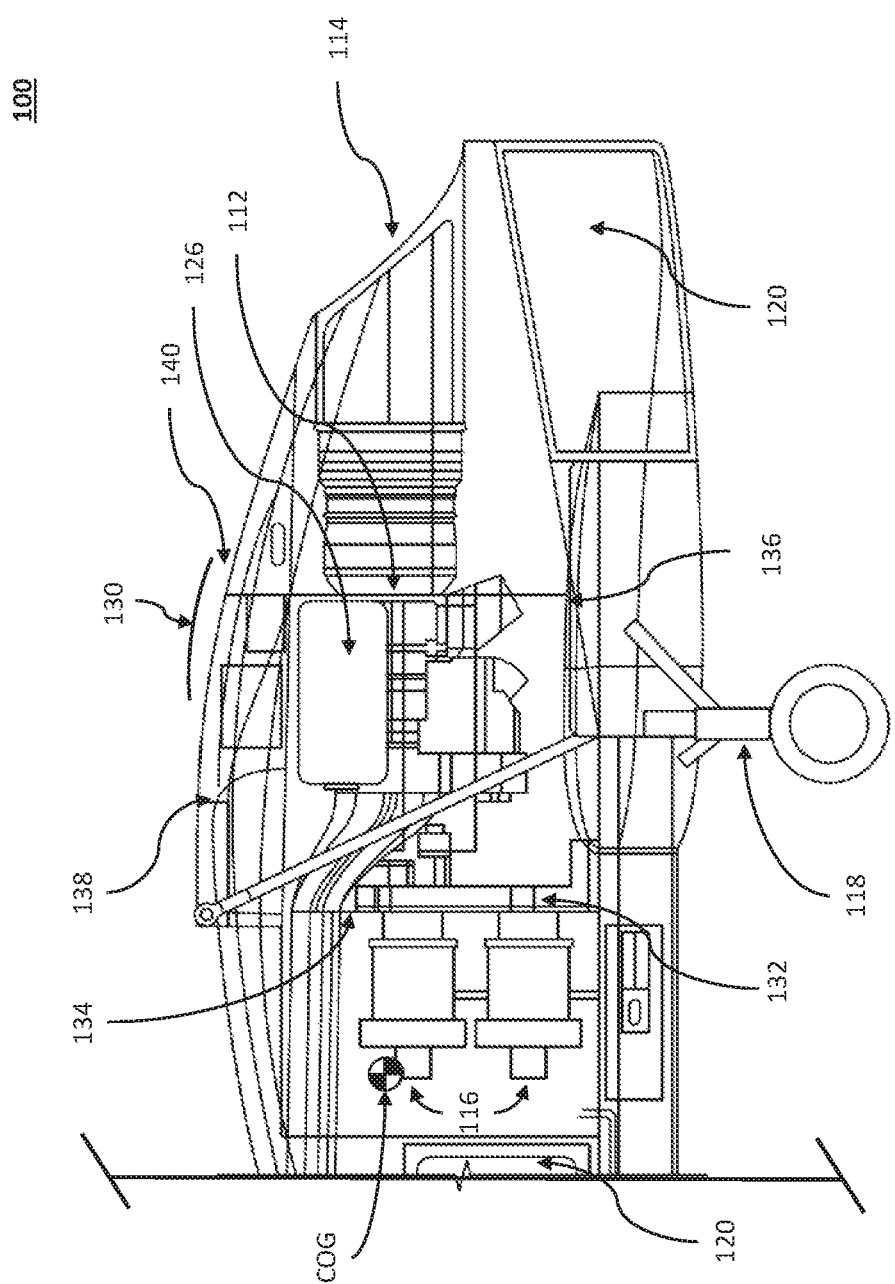
Figure 2:
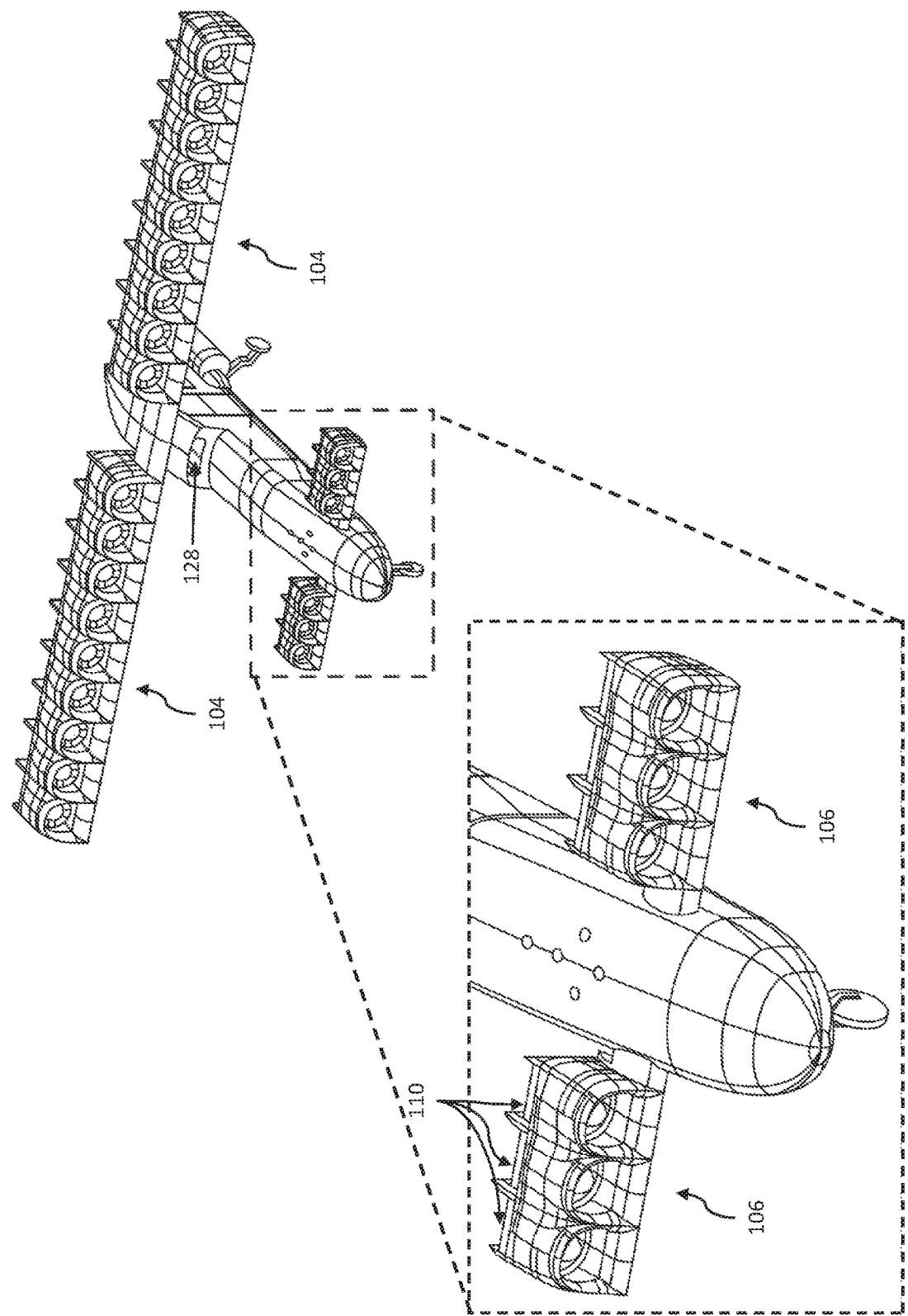
FIG. 2 illustrates a second example hybrid propulsion aircraft, which employs fewer canard ducted fans.

FIGS. 1*a* through 1*g* illustrate an example hybrid propulsion aircraft 100 according to an aspect of the present invention. FIG. 1*a* illustrates a front view of the hybrid propulsion aircraft 100, while FIG. 1*b* illustrates a side view of the hybrid propulsion aircraft 100. FIG. 1*a* illustrates one side of the hybrid propulsion aircraft 100 in a vertical wing configuration (vertical flight mode) to generate vertical thrust, and the opposite side of the hybrid propulsion aircraft 100 in a horizontal wing configuration (horizontal flight mode) to generate horizontal thrust. FIG. 1*c* illustrates a top plan view of the hybrid propulsion aircraft 100, while FIGS. 1*d* and 1*e* illustrate, respectively, rear and front isometric views of the hybrid propulsion aircraft 100. Finally, FIGS. 1*f* and 1*g* illustrate side views of the hybrid propulsion aircraft 100 with body panel portions omitted to better illustrate certain of the internal components of the hybrid propulsion aircraft 100.

The hybrid propulsion aircraft 100 is generally described as being unmanned and fully autonomous (i.e., requiring no remote control pilot), but a cockpit may be added to enable manned operation. Similarly, the hybrid propulsion aircraft 100 may be remotely controlled over a wireless communication link by a human operator, computer operator (e.g., remote autopilot), or base station. The hybrid propulsion aircraft 100 can also accommodate a cabin between the primary and canard wings 104, 106 configured to carry passengers.

The hybrid propulsion aircraft 100 may have a primary wingspan of about 10 to 100 feet, and a canard wingspan of 5 to 50 feet. The length of the fuselage may be about 10 to 75 feet, while the overall height of the example hybrid propulsion aircraft 100 may be 5 to 20 feet. When loaded with a payload and wet (i.e., including fluids, such as fuel, oil, etc.), the hybrid propulsion aircraft 100 may weigh around 300 to 12,000 pounds. As one of skill in the art would appreciate, the hybrid propulsion aircraft 100 can be scaled up or down to facilitate a particular purpose based on, for example, flight objective and/or flight plan. Thus, individual ducted fans may be added to, or removed from, the wings to provide the thrust necessary for a given aircraft size. Alternatively, the ducted fans may be enlarged or reduced in size to achieve a targeted thrust power. For example, in certain aspects, the thrust assembly 500 may be removably configured as modules to enable quick substitution or replacement on the fly.

The hybrid propulsion aircraft 100 generally comprises a fuselage 102, two primary wings 104, two canard wings 106, and a distributed electric propulsion system, which generates the thrust necessary for flight using a plurality of ducted fans (e.g., primary ducted fans 108 and canard ducted fans 110). For example, as best illustrated in FIGS. 3a and 3b, each wing may be arranged with a plurality of immediately adjacent (i.e., abutting one another) integrated ducted fans across the wingspan of a wing or wing set. Each of the ducted fans generally comprises a thrust assembly 500 positioned within a duct chamber 414, the duct chamber 414 being defined by the lower and upper primary airfoils 302, 304 and ribs of the primary and canard wings 104, 106.

In certain aspects, the wings, or portions thereof, may be modular where additional ducted fan modules may be quickly added, removed, and/or substituted (e.g., with a differently rated ducted fan). For example, each ducted fan module may comprise a thrust assembly 500 and a duct chamber 414. A ducted fan module's duct chamber 414 may be configured to removably couple with an adjacent ducted fan module's duct chamber 414 (e.g., at the separator plate 408). Electrical connectors would be provided to facilitate power transfer between the ducted fan modules. In such an example, the length of the wings may be guided by the number of ducted fan modules employed.

The hybrid propulsion aircraft 100 further includes landing gear 118 (e.g., nose-end landing gear and main landing gear), one or more fuel tanks 120, an avionics bay 122, a payload bay 124, a heat exchanger 126 (e.g., an air-cooled oil cooler with fan), a forward facing air inlet 128 that supplies air to the engine 112, a rear facing engine exhaust nozzle 114 coupled to the aft end of the engine 112 that expels exhaust from the engine 112, and a power distribution and synchronization avionics module 130. The exhaust nozzle 114 may have a constant area along its length. In lieu of, or in addition to, the landing gear 118, the hybrid propulsion aircraft 100 may employ landing skids.

To provide climate control to the engine bay, one or more cutouts or openings may be provided in the fuselage's 102 skin (e.g., adjacent the engine 112 and/or primary generators 116). One or more cooling fans may be positioned in the engine bay at each opening and configured to draw air into the engine bay, thereby cooling the engine 112, primary generators 116, and/or other components. The engine 112 may include one or more starter batteries to provide a starting current to said engine 112 upon ignition. The cooling fans also pressurize the engine bay and force air through an exhaust, or gap in the fuselage. The landing gear 118 may be retractable with a door, thereby reducing drag during horizontal flight.

The hybrid propulsion aircraft's 100 structure, including the fuselage 102 and wings 104, 106, may be fabricated using a composite material (or laminate thereof) including, inter alia, a graphite, fiberglass, or aramid and honeycomb core sandwich construction and connected using metal fittings (e.g., aluminum, titanium, lightweight alloys, etc.). The hybrid propulsion aircraft's 100 structure may further comprise embedded conductors, which may convey power and/or data signals throughout the hybrid propulsion aircraft 100. For example, the embedded conductors may be formed as a conductor sandwich assembly, such as is described in greater detail by commonly owned U.S. Pat. No. 8,937,254, titled "Apparatus and Method for an Aircraft Conductor Sandwich Assembly Embedded to an Aircraft Structure." Furthermore, these conductors may reside on the outer mold line (OML) of the vehicle to aid in thermal management and use free stream air for cooling. Additionally, the conductors may be placed throughout the aircraft structure to aid in the heating of various components that may require environmental control and/or to provide additional benefits such as de-icing or anti-icing characteristics to the structure of the aircraft accomplished by having the heat generator conductors in close proximity to the surfaces requiring heating.

As best illustrated in FIGS. 1a and 1c, a primary wing 104 and a canard wing 106 are positioned on each side of the fuselage 102. The two primary wings 104, defining a primary wing set, and two canard wings 106, defining a canard wing set, are pivotally mounted to the hybrid propulsion aircraft's 100 airframe (e.g., at the topside of the fuselage 102) to provide tilt-wing functionality. For instance, the fuselage 102 may comprise a plurality of actuator-controlled pivotal connectors 802, 902, which selectively pivot the primary and canard wings 104, 106 responsive to signals from the flight controller. In certain aspects, the canard wings 106 may be partially or fully retracted into the fuselage 102 when not in use or during forward flight.

Each of the two primary wings 104 is preferably the same length, thereby providing balance to the wing set on each side for the fuselage 102. Likewise, each of the two canard wings 106 is preferably the same length. The primary and canard wing sets may be arranged at an anhedral angle, thereby compensating for, or mitigating, any change in center of gravity and controlling the center of thrust, when the primary and/or canard wing sets are in a vertical wing configuration (e.g., vertical flight mode) or an intermediate tilted wing configuration (e.g., during transition, where the wing is positioned between vertical and horizontal). As is appreciated by those having ordinary skill in the art, an anhedral angle refers to a negative dihedral angle, that is, a downward angle of the wings relative to a horizontal axis. In other aspects, the primary and/or canard wings 104, 106 may be canted.

The two primary wings 104 of the primary wing set may be fixedly coupled to one another such that they tilt and operate in unison. To that end, as described with regard to FIGS. 6a through 6c, the two primary wings 104 may share one or more continuous spars and/or skin panels. Similarly, the two canard wings 106 may be fixedly coupled to one another as described with regard to FIG. 7. In certain aspects, however, it is contemplated that the tilt of the primary wings 104 and/or the two canard wings 106 may be independently controlled. That is, one wing may be tilted at a first angle relative to the fuselage 102, while certain of the remaining three wings may be tilted at different angles, thereby improving agility and/or dynamically countering a gust or other outside force.

The distributed electric propulsion system generally comprises an engine 112, a gearbox 132, one or more primary generators 116, and a plurality of ducted fans, each of said plurality of ducted fans being driven by an electric motor. The plurality of ducted fans may include a plurality of primary ducted fans 108 positioned on the primary wings 104 and a plurality of canard ducted fans 110 positioned on the canard wings 106. As illustrated, the engine 112 may be configured to drive a gearbox 132. Suitable engines 112 include, for example, turbo shaft and turbine engines. A turbo shaft engine refers to a gas turbine engine that is optimized to produce shaft power, rather than jet thrust. The engine 112 may be mounted to, for example, a first bulkhead 136, while the gearbox 132 mounted to a second bulkhead 134.

The distributed electric propulsion system uses an all-electric drivetrain. The engine 112 and the primary generators 116 are also locally situated, thereby obviating the need for a long driveshaft therebetween, and obviating the need for any driveshaft between the primary generators 116 and electric motors (which would result in efficiency loss). For example, the engine 112 and the primary generators 116 may be directly coupled to the gearbox 132. Moreover, because the primary generators 116 and fan motors 506 operate in synchronization and at a single voltage and frequency, electronics need not be used between the generator 116 and the fan motors 506 to invert or convert the voltage of the power supply or commutate/modulate the frequency. In fact, such electronics would dissipate power, even when electronically efficient components are used. For example, no need exists for brushless motor controllers, rectifiers, DC-DC converters, regulators, etc., which, even assuming efficient electronics, would dissipate some measurable amount of power. However, additional power electronics may be used to provide system benefits such as adjusted power factor, aid in synchronization, or other various benefits at either low powers and voltages or rated voltage and power. While the primary generators 116 and fan motors 506 may run at different speeds, depending on the number of poles in the primary generators 116 and fan motor 506 (a constant electrical "gear ratio"), the fan motors 506 run at a substantially constant RPM. Furthermore, the all-electric drivetrain may operate at one frequency, where noise may be filtered out to mitigate electromagnetic interference ("EMI"). Finally, the voltage may be maintained at a constant value throughout the all-electric drivetrain, again, obviating the need to convert the power supply to the ducted fans' motors 506.

The gearbox 132, in turn, can be coupled with a plurality of generators, including one or more primary generators 116 (e.g., 1 to 5 generators, more preferably 3 generators) and/or one or more auxiliary power generators 1004, which may power onboard accessories or systems. The gearbox 132 may be further configured to drive other devices, such as a hydraulic pump 1010, an oil pump 1008, etc. The hybrid propulsion aircraft 100 may employ a hydraulic system to control, for example, the wing-tilt actuators/motors, the main landing gear actuator(s), nose landing gear actuator(s), the main landing gear brakes, etc.

The primary generators 116 provide AC power to the plurality of fan motors. Each ducted fan employs a thrust assembly 500 having a fan motor 506, which may vary in size and power rating depending on its position on the hybrid propulsion aircraft 100 and/or required thrust. One of skill in the art, however, would appreciate that additional, or fewer, primary generators 116 may be used depending on the desired power or thrust, which is guided by, inter alia, the quantity and/or size of the ducted fans (or motors therein).

According to one aspect, for example, the hybrid propulsion aircraft 100 may employ 10 to 24, more preferably about 16 to 20, primary ducted fans 108 and 2 to 16, more preferably 6 to 12, canard ducted fans 110. The primary ducted fans 108 may be about 20 to 40 inches in fan diameter, while the canard ducted fans 110 may be about 10 to 30 inches in fan diameter. The primary ducted fans 108 and canard ducted fans 110 may be evenly spaced along the wingspan, leaving only a nominal gap between fan blade tips (e.g., abutting one another).

To manage the power distribution, the amount of thrust distributed by each of the ducted fans can be varied by pitching the fan blades according to algorithms, which may be executed by flight control computers. That is, through the variable pitch fan blades (e.g., via pitch control mechanism 520), the power from each ducted fan may be independently controlled while maintaining the electric motors at the same speed. Accordingly, the operator may individually adjust the thrust at each ducted fan, thereby enabling the operator, whether computer or human controlled, to change the lift distribution across a given wingspan. In other words, the ducted fans may be operated at the same motor speed, but the thrust from each ducted fan may be independently adjusted by changing the pitch of the fans without changing motor speed. The nozzles may be adjusted for efficiency (e.g., control nozzle area) and thrust vectoring. To that end, a thrust nozzle may be positioned at the back of each (aft end) of the ducted fans. The thrust nozzles are adjustable (e.g., via nozzle actuators 628 and trailing edge control surfaces 406) to enable the operator to individually adjust, for example, the thrust vector of each ducted fan and or the thrust itself. With the addition of DC electronics, a similar method could be used with the added utility of controller speed of the fans as well as pitch or just speed with fixed pitch or any combination thereof.

The hybrid propulsion aircraft 100 may employ a plurality of sensors, in conjunction with the flight controller, to detect and counter any flight anomalies (e.g., gusts, deviation from flight plan, etc.) by adjusting one or more of the adjustable ducted fans and/or adjustable thrust nozzles to reallocate thrust or the direction of thrust as needed. In operation, an operator can operate each piece (e.g., ducted fan) of a wing at its maximum performance condition throughout the vertical, transition, and horizontal flight regimes; thus mitigating lift loss. For example, when encountering flight anomalies, the operator may adjust the thrust to load or unload one or more fan motors to maintain the synchronization of the motors and generators. Moreover, this configuration allows the fan motors 506 to be driven at the same speed, while providing the operator with the ability to adjust the thrust of a given ducted fan. Indeed, the operator can adjust the thrust along a wingspan to the change lift distribution without changing the fan motor speed, thereby enabling the wing to operate as a lifting propulsion (i.e., the wing can provide both lift and propulsion). As described with regard to FIGS. 5a through 5c, the operator may also adjust the fan blade pitch to change the thrust. Specifically, the fan blade pitch may be adjusted to increase the efficiency of the hybrid propulsion aircraft 100 as a whole during various modes of operation. For example, in modes of operation where the hybrid propulsion aircraft 100 requires less power, the fan blade pitch may be flat pitched such that they draw very little power. As a result and as noted above, the hybrid propulsion aircraft 100 may generate excess power during modes of operation that require less power, such as horizontal flight mode.

The components of the hybrid propulsion aircraft 100 are preferably positioned such that the hybrid propulsion aircraft's 100 center of gravity remains substantially constant, whether the wings are level (horizontal flight position) or up (vertical flight position), and whether the payload bay 124 and/or fuel tanks 120 are empty or full. As can be appreciated by those of ordinary skill in the art, the term center of gravity generally refers to a point at which, if the hybrid propulsion aircraft 100 were suspended, it would be balanced in all positions—i.e., hybrid propulsion aircraft's 100 hypothetical balancing point in all directions. The center of gravity may be determined using known techniques (e.g., using computer-aided design (CAD) software or using known mathematical equations).

To that end, the fuel tanks 120 may be distributed to maintain the vehicle's center of gravity. The center of gravity is identified in FIGS. 1f and 1g as COG. For instance, the hybrid propulsion aircraft 100 may employ a forward fuel tank and an aft fuel tank, each of which may be gravity filled. A transfer pump may be positioned between the two tanks to facilitate center of gravity trimming. The fuel bays may be sealed. Baffles may be installed in the fuel tanks 120 to mitigate any slosh and fuel starvation issues. Each tank may employ one or more fuel level sensors. For instance, two fuel level sensors may be used per tank for redundancy (i.e., should one fail or otherwise malfunction). A fuel drain can be positioned on the bottom of fuselage 102, under the forward tank. Moreover, the payload bay 124 may be positioned near the hybrid propulsion aircraft's 100 center of gravity and split (by volume) into two bays along centerline keel. In certain aspects, the payload bay 124 may house the flight termination system and flight instrumentation.

An opening in the topside of the hybrid propulsion aircraft 100 receives conductors 138 from the components (e.g., ducted fans, actuators, etc.) mounted on or in the primary and canard wings 104, 106. The conductors 138 from the fan motors 506 are operatively coupled to the primary generator(s) 116 positioned within the fuselage 102. The conductors 138 from other electronics (e.g., peripheral avionics, control surface actuators, lights, sensors, etc.) may be operatively coupled to other devices positioned within the fuselage 102, such as the primary generators 116, the auxiliary power generators 1004, and/or other onboard systems or devices.

To increase streamlining and to reduce drag, a removable upper fairing 140 may be positioned over the opening, conductors 138, and other harnessing. Unique generator control and synchronization hardware residing at or near the generators obviates the need for any other power electronics between the generators and the fan motors as the generators drive the motors in a direct line to line fashion. The power may be carried in conductors through Litz wire and/or a metal tube of varying diameter and material for more efficient power transfer, each of which reduces losses associated with AC power, specifically at higher frequencies, due, at least in part to skin effect. A Litz wire comprises a number of individually insulated magnet wires twisted or braided into a uniform pattern, so that each strand tends to take all possible positions in the cross-section of the entire conductor.

An avionics bay 122 may house the various navigation and flight control systems, which control the various aircraft components and functions. The navigation and flight control systems may be communicatively coupled with an inertial navigation system ("INS") that is communicatively coupled with an inertial measurement unit and global positioning system ("GPS") receiver, an onboard data storage device (e.g., hard drive, flash memory, or the like), a wireless communication device, or virtually any other desired services. The GPS gives an absolute drift-free position value that can be used to reset the INS solution or can be blended with it by use of a mathematical algorithm, such as a Kalman Filter. The avionics bay 122 may also house, for example, an intelligence, surveillance, and reconnaissance ("ISR") surveillance payload, which may be used to collect data and/or monitor an area. For example, the hybrid propulsion aircraft 100 may be equipped with one or more cameras, audio devices, and other sensors, especially those requiring large amounts of electric power. Any video, or other data, collected by the hybrid propulsion aircraft 100 may be communicated to a ground control station in real time wirelessly. The hybrid propulsion aircraft 100 may be further equipped to store said video and data to the onboard data storage device. In certain aspects, the number of canard ducted fans 110 may be adjusted to achieve a targeted weight to power ratio. That is, fewer fans and motors may be used in the canard wing 106 or primary wing 104 to reduce the overall weight of the hybrid propulsion aircraft 100.

FIGS. 3a and 3b illustrate, respectively, front and rear isometric views of an arrangement of ducted fans, such as those forming the primarily wing 104 and the canard wing 106. As illustrated, a duct chamber 414 is defined by a lower primary airfoil 302, an upper primary airfoil 304, and one or more separator plates 408, which are positioned between adjacent thrust assemblies 500. The trailing edge of the upper and lower primary airfoils 302, 304 may comprise a plurality of control surfaces 406 (e.g., ailerons or elevens), which may be independently controlled to adjust the thrust nozzle. For instance, the control surfaces 406 may be controlled to adjust the thrust nozzle's area (i.e., nozzle area) of a particular ducted fan. That is, the nozzle actuators 628 (positioned within the separator plates 408) may be actuated to drive the control surfaces 406, thereby adjusting the nozzle area and thrust vector.

Figure 3C:
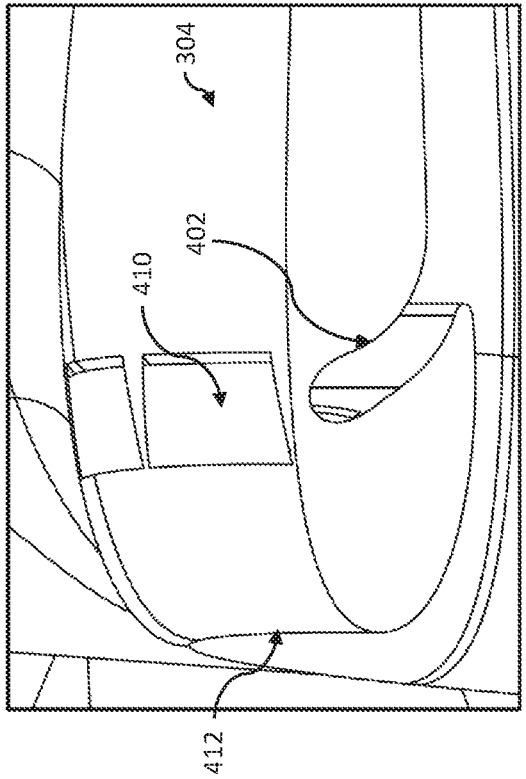
FIGS. 3c and 3d illustrate the ducted fan arrangement with slot doors in an open position.
Figure 3D:
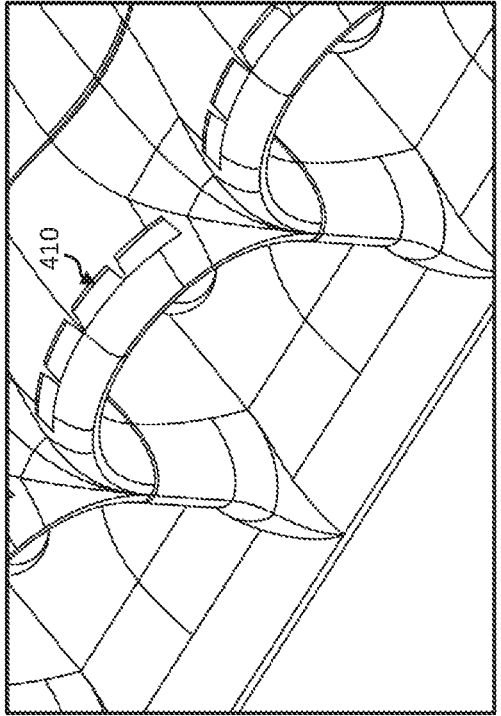
Figure 3E:
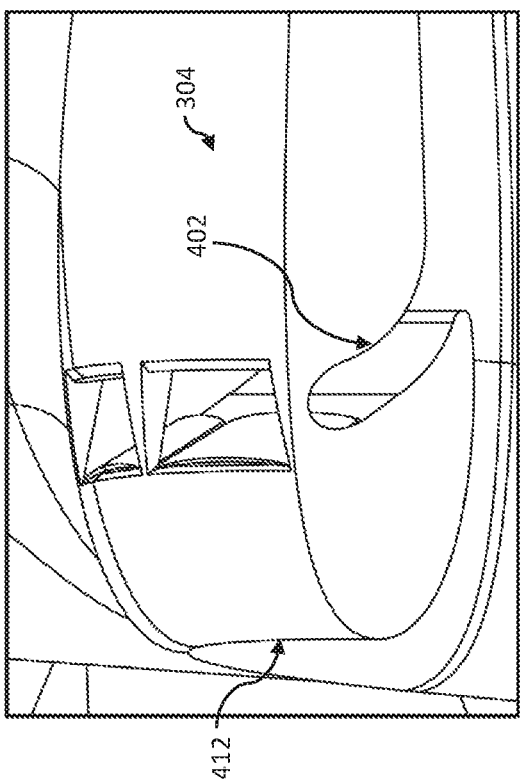
FIGS. 3e and 3f illustrate the ducted fan arrangement with slot doors in a closed position.
Figure 3F:
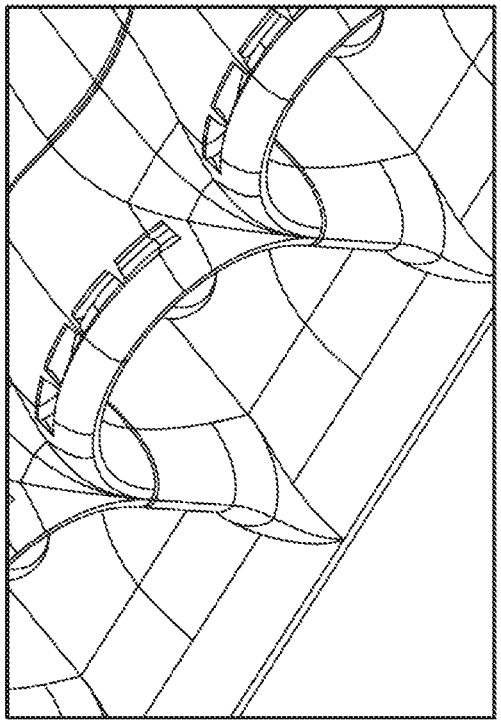

One or more airflow slots 402 may be positioned at the upper leading edge 412 of the upper primary airfoil 304. The one or more airflow slots 402 guide airflow into the duct chamber 414 and toward the thrust assembly 500. Each airflow slot 402 may be selectively sealed/blocked using a slot door 410. FIGS. 3c and 3d illustrate the slot doors 410 in an open position (i.e., allowing airflow through the airflow slot 402), while FIGS. 3e and 3f illustrate the slot doors 410 in a closed position (i.e., blocking airflow through the airflow slot 402). The airflow slots 402 in the upper leading edge maintain flow attachment inside the duct chamber 414 in vertical flight mode and at high angle of attack (AoA). Constantly decreasing area through the airflow slot 402 (i.e., from the inlet to outlet) ensures smooth flow inside airflow slot 402. The slot doors 410 may be lightly sprung to ensure that they close properly for horizontal flight, whereby a pressure differential will pull the slot doors 410 open when needed for flow control. Finally, the windward leading edge 404 of the lower primary airfoil 302 is relatively thick, thus increasing hover and transition performance.

Figure 4A:
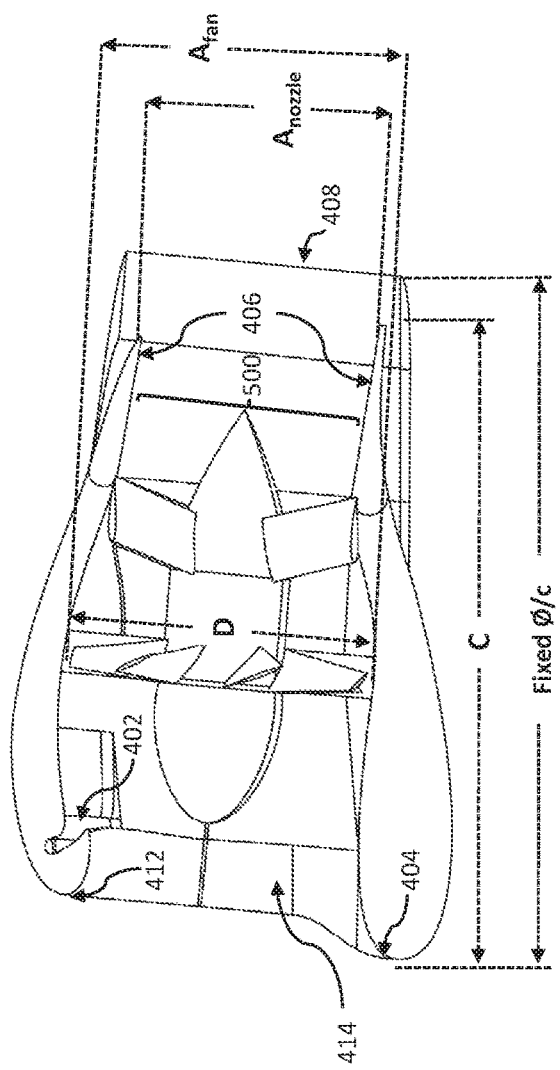
FIGS. 4a and 4b illustrate, respectively, side and top cross sectional views of a ducted fan.
Figure 4B:
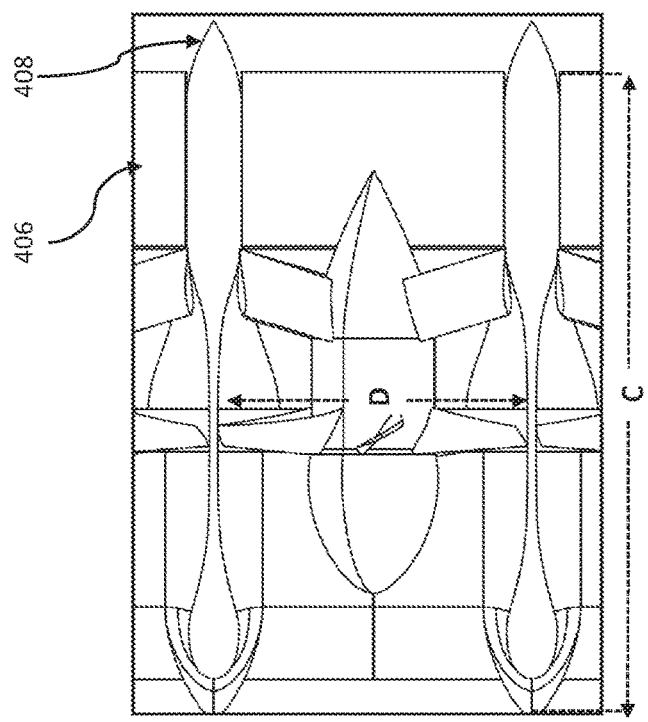
Figure 4C:
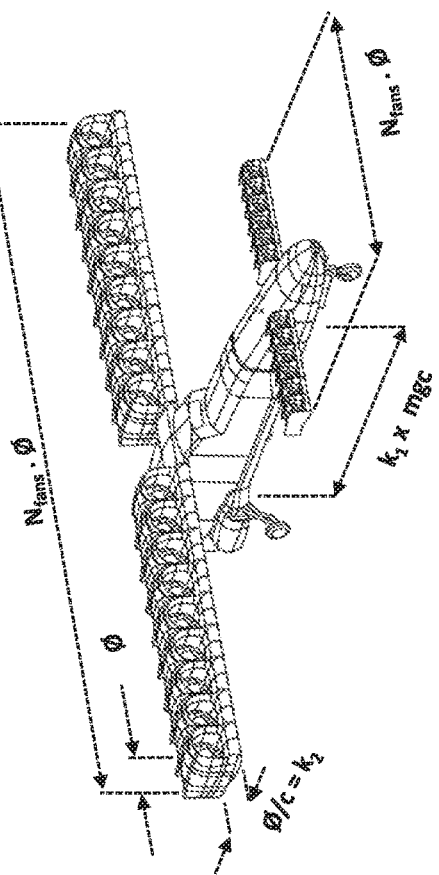
FIG. 4c illustrates a front isometric view of the hybrid propulsion aircraft.

FIGS. 4a and 4b illustrate, respectively, side and top cross sectional views of a ducted fan, while FIG. 4c illustrates a front isometric view of the hybrid propulsion aircraft 100. As illustrated, the ratio of the length (C) to diameter (D) of the duct chamber 414 is relatively short. The ratio may be, for example, between 1.5 and 2.5, more preferably about 2. The performance and geometry of the vehicle are dictated by the ratio of nozzle area ($A_{nozzle}$) to fan area ($A_{fan}$) and disc loading. For example, as the nozzle area increases, efficiency at low speed/hover and high speed is improved. For example, area ratio is increased in hover and decreased in high speed forward flight. The control surfaces 406 have flattened inner surfaces to yield high speed performance, while thick separator plates 408 allow change in lower area ratios without separation. The separator plates 408 may comprise a rib covered by a fairing, which may house one or more controllers or actuators (e.g., nozzle actuator 628).

Figure 5A:
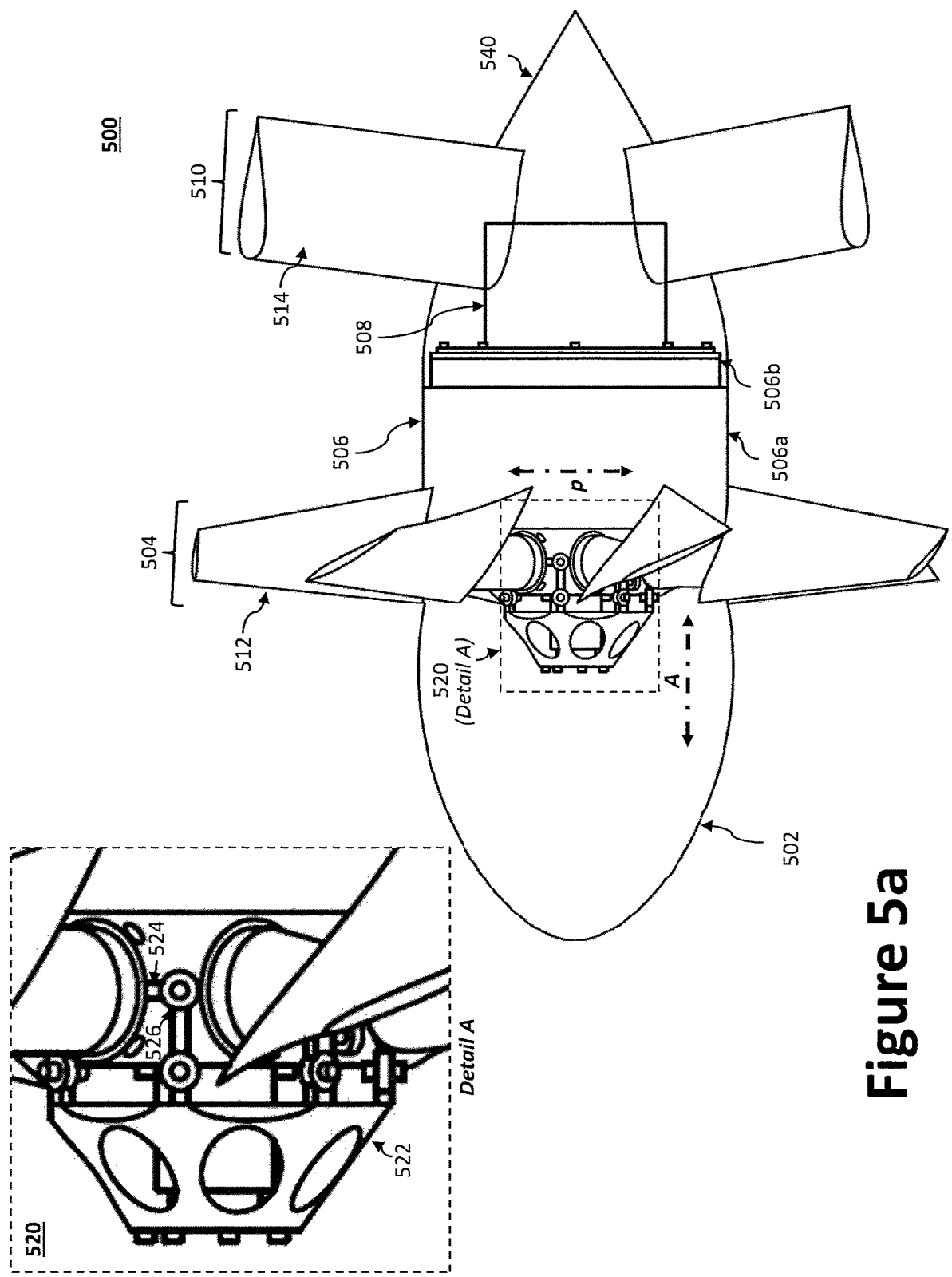
FIGS. 5a through 5c illustrate an example thrust assembly having a pitch control mechanism.
Figure 5C:
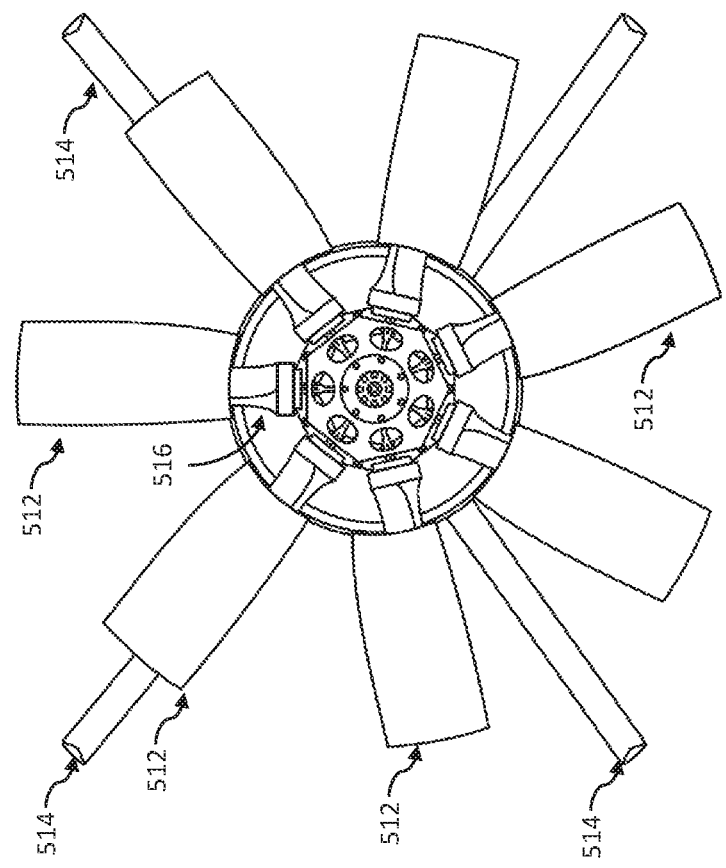
Figure 5B:
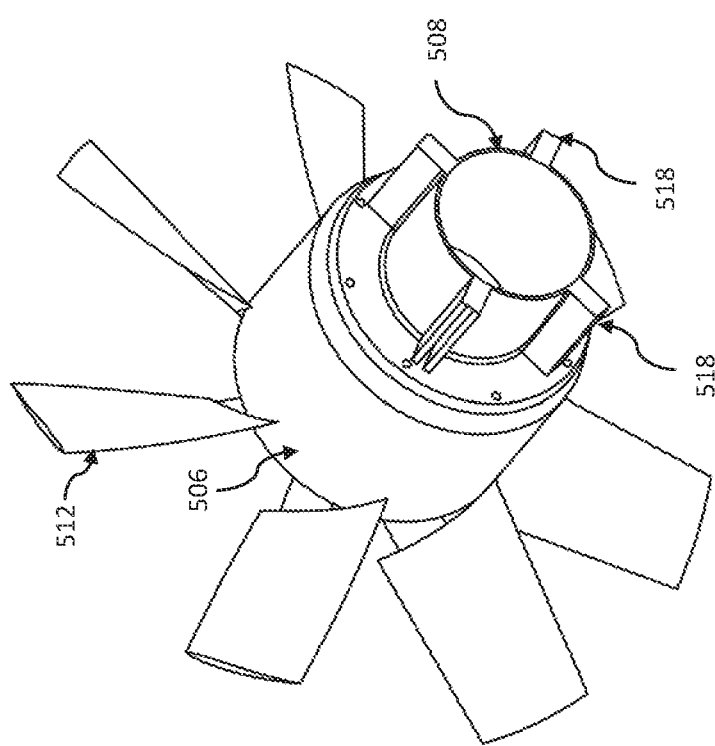

FIGS. 5a through 5c illustrate an example thrust assembly 500 configured with a pitch control mechanism 520. FIG. 5a illustrates a side view of a complete thrust assembly 500. The thrust assembly 500 generally comprises a nacelle 502, a rotating fan 504, an electric fan motor 506, a structural hub 508, an aero stator 510, and a fairing cone 540. The rotating fan 504 comprises a plurality of fan blades 512 (e.g., 2 to 10, more preferably 4 to 7 fan blades 512), while the aero stator 510 comprises a plurality of stator blades 514 (e.g., 2 to 6, more preferably 4 stator blades 514). The electric fan motor 506 comprises a motor inner and outer iron with magnets (collectively identified as 506a) and a motor stator 506b. The motor stator 506b, which comprises a copper coil, is static (i.e., does not rotate). As illustrated in FIG. 5b, the structural hub 508 is configured with a plurality of motor securing slots 518, each being sized and shaped to receive a stator blade 514 or portion thereof. The structural hub 508 bolts the motor stator 506b to the aero stator's 510 stator blades 514.

The fan motors 506 may be brushless direct current ("BLDC") motors, which have shown to be efficient in the disclosed configuration, but other motor types may be used, including, without limitation, brushless (BL) motors, electronically commutated motors (ECMs or EC motors), brushless electric motor, squirrel cage, induction, brushed, AC motors, etc. In certain aspects, the fan motors 506 used in the primary ducted fans 108 are larger than the fan motors 506 used in the canard ducted fans 110.

FIG. 5c illustrates a frontal plan view of a thrust assembly 500 with the nacelle 502 removed. The fan blades 512 are coupled to the rotating hub via a plurality of blade grips 516 and pitch housing. The pitch of the fan blades 512 may be dynamically controlled via the pitch control mechanism 520, which is illustrated in Detail A. The pitch control mechanism 520 may comprise a pitch arm 524, pitch link 526, a torque plate, and a translating pitch cone 522.

A pitch arm 524 extends lengthwise into each of the pitch housings and, when actuated, imparts an axial movement, which causes the blade grip 516 and fan blade 512 to axially rotate, thereby changing the pitch. Each pitch arm 524 is driven by a pitch link 526 that couples the pitch arm 524 to the translating pitch cone 522. The translating pitch cone 522 selectively moves laterally toward and away from the hub (direction A), but is spline-guided to rotate with the hub via the rotor pitch mast. In other words, the translating pitch cone 522 is configured to travel laterally perpendicular with regard to a plane defined by the fan's rotation (plane p). The translating pitch cone 522 may be laterally driven by a pitch control motor through, for example, a ball screw driven, spline-guided pitch actuation rod, which does not rotate, but imparts a lateral force (in direction A) onto the rotating rotor pitch mast.

In operation, the pitch control motor's shaft rotates, causing the screw driven actuation rod to selectively extend and retract in direction A. The actuation rod causes the translating pitch cone 522 to correspondingly travel with the actuation rod direction A. As the translating pitch cone 522 travels, the plurality of pitch links 526 coupled to the translating pitch cone 522 also travel in direction A. The pitch links 526 impart a torsional force onto the pitch arm 524, causing it (and the blade grip 516) to rotate axially about a pivot point of the fan blade 512.

The flight control system can use the pitch control mechanism 520 to change a fan blade pitch for a given ducted fan, thereby individually controlling the thrust of the ducted fans (and changing the torque and the current needed). To compensate for an increase or decrease in current draw, the fan blades would change pitch accordingly thus loading or unloading the motor as needed to maintain synchronicity. In response, the engine 112 may be throttled, or otherwise configured, to supply additional torque necessary, while maintaining RPM with the associated generator(s) 116. Thus, as long as the fan motors 506 do not exceed a torque limit, the fan motors 506 will spin in synchronization with the primary generators 116. A plurality of spindle bearings may provide reduced friction between the contact point between the hub and the pitch actuation rod's outer housing. Similarly, spindle bearings may be provided between each blade grip 516 and pitch housing, to mitigate friction as the fan blades 512 are pitched (i.e., axially rotated).

Figure 6A:
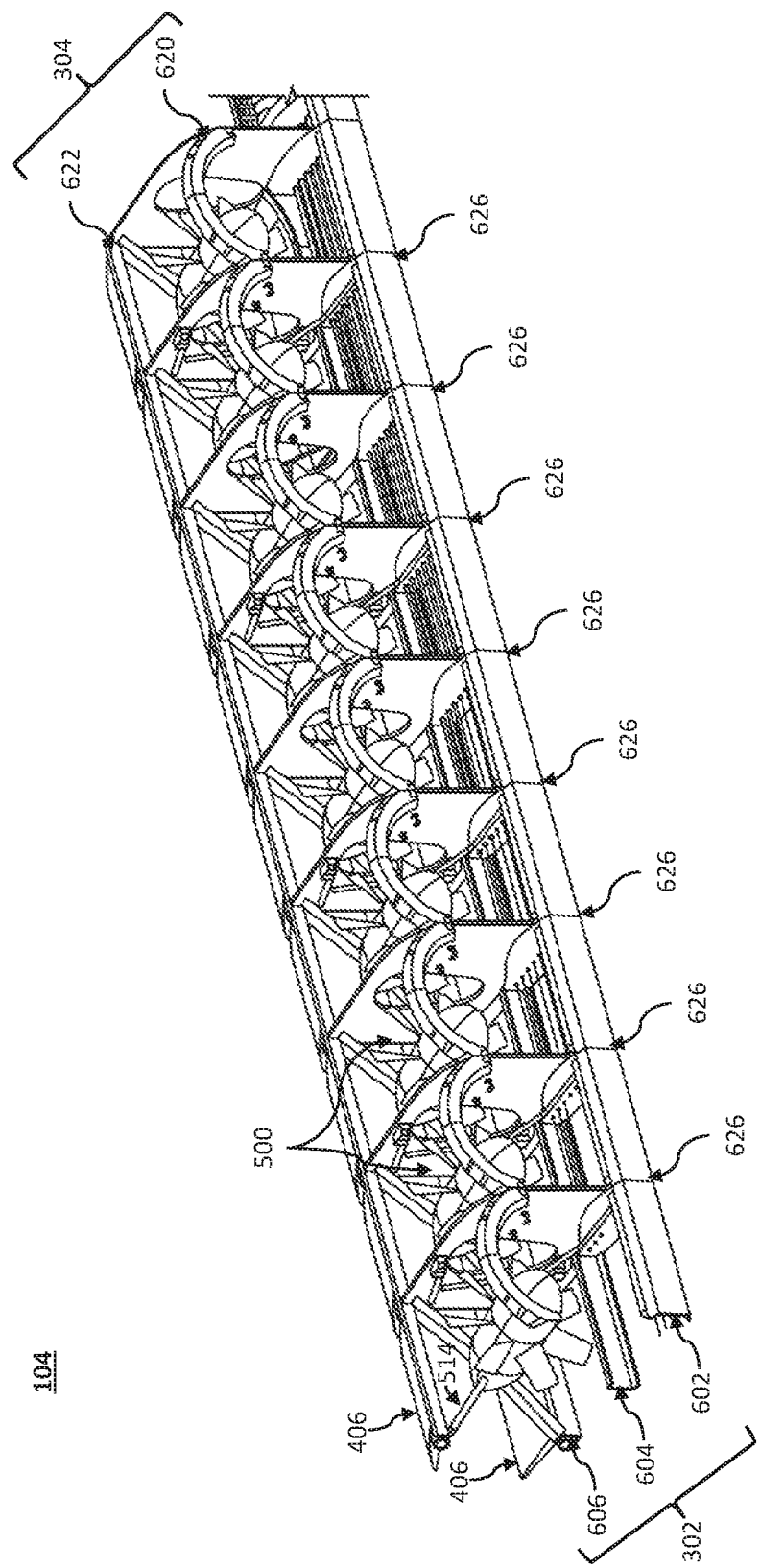
FIGS. 6a through 6c illustrate an example structural layout of a primary wing.
Figure 6B:
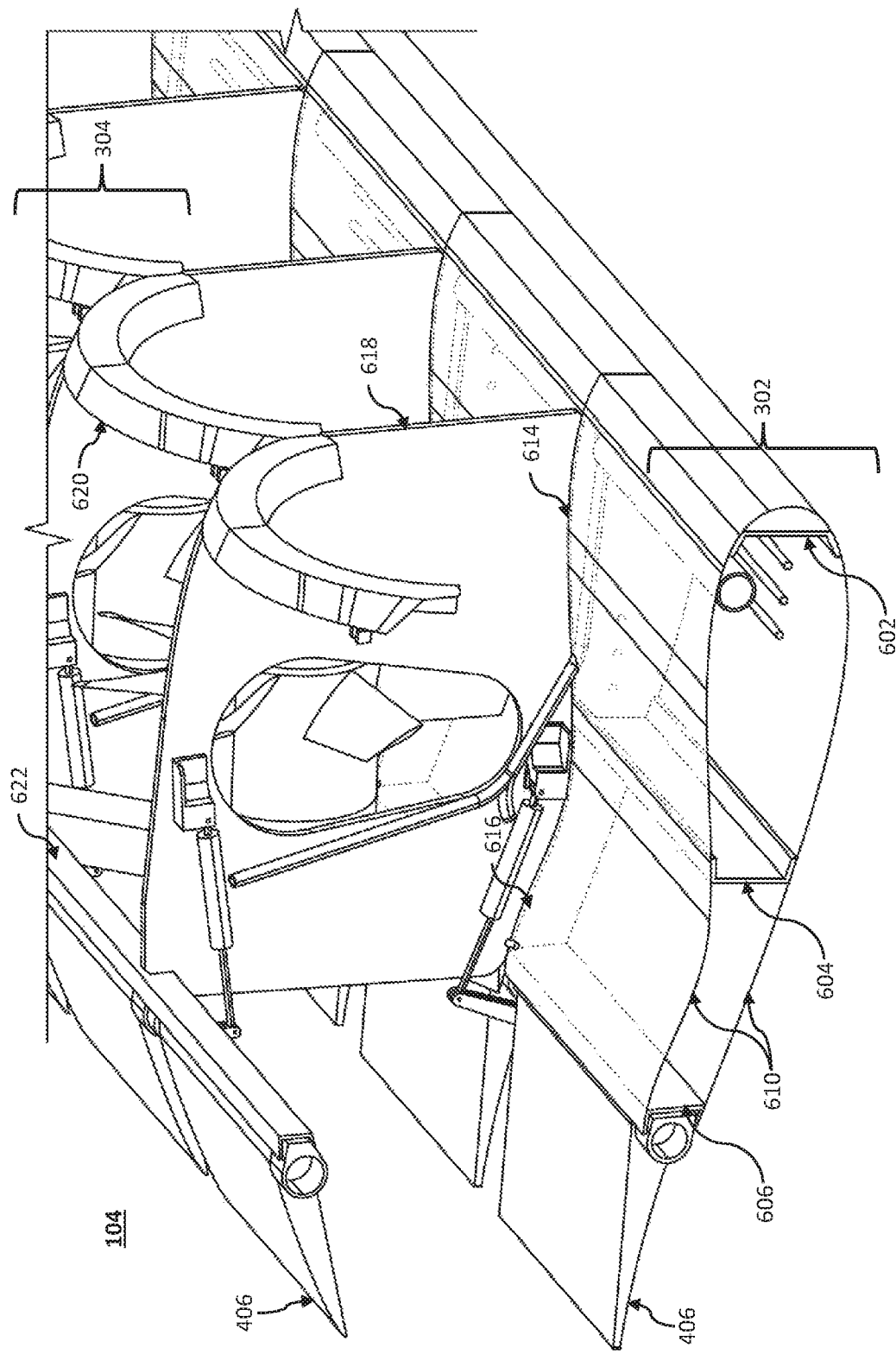
Figure 6C:
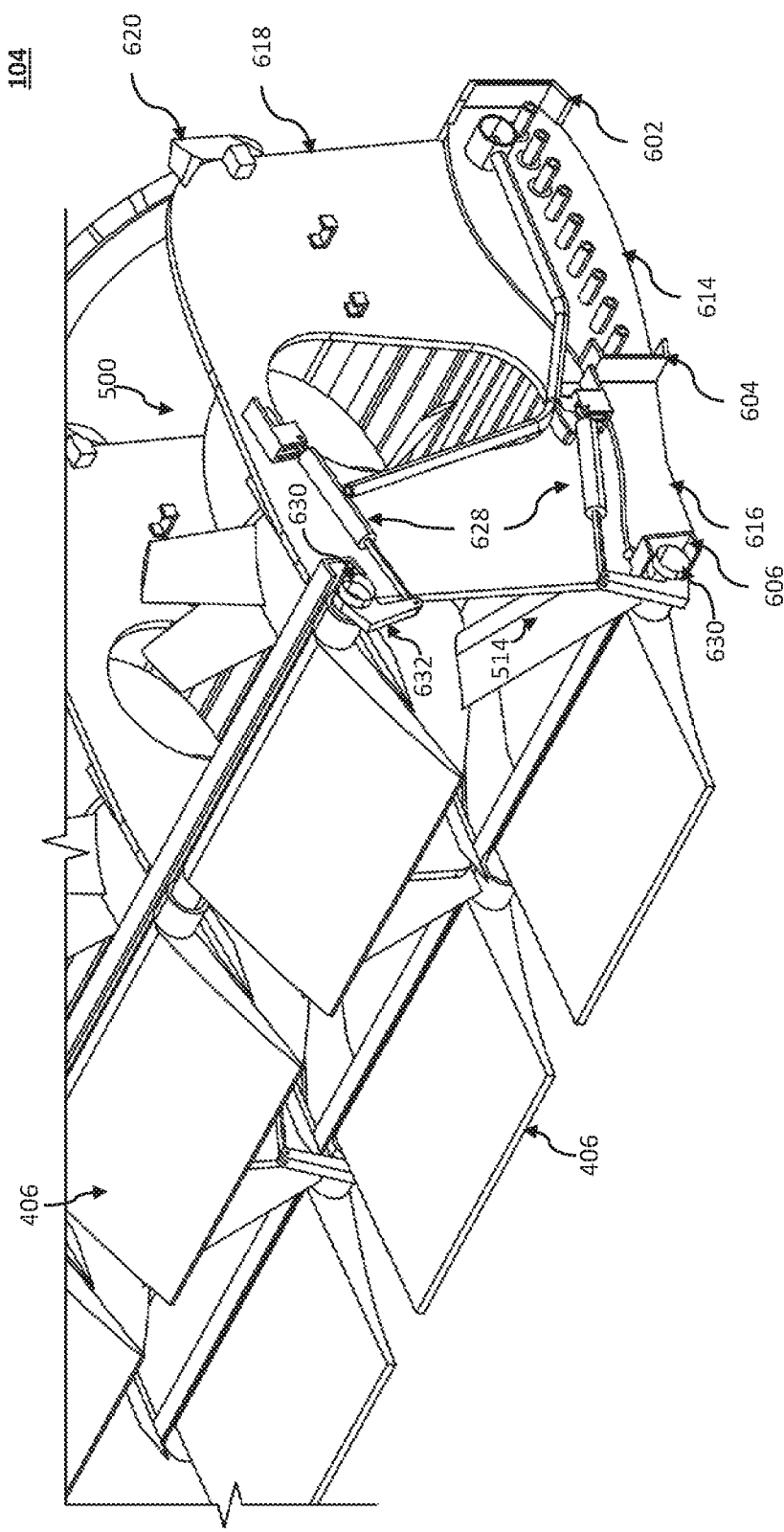

FIGS. 6a through 6c illustrate an example structural layout of a primary wing 104, which generally comprises a lower primary airfoil 302, an upper primary airfoil 304, and a plurality of rib stations 626, where the lower primary airfoil 302 functions as the main structural component. The lower primary airfoil 302 generally comprises a forward spar 602, a mid-spar 604, and a lower aft spar 606. The upper primary airfoil 304 comprises an upper leading edge support 620 and an upper aft spar 622. A primary function of the lower aft spar 606 and the upper aft spar 622 is to facilitate mounting of trailing edge control surfaces 406 and stator blades 514. When the primary wings 104 are configured to operate in unison, the forward spar 602 and the mid-spar 604 may be continuous through the center section (i.e., the point where the primary wings 104 pivotally couple to the fuselage 102). Structural skin 610 may be provided on upper and lower side of the lower primary airfoil 302, running continuously under the thrust assemblies 500.

In one aspect, three ribs may be positioned at each rib station 626 (e.g., the area between each thrust assembly 500), which is ultimately covered with a fairing to define the separator plate 408. Two ribs may be provided in the lower primary airfoil 302. Specifically, a forward rib 614 may be positioned between the forward spar 602 and the mid spar 604, while an aft rib 616 may be positioned between the mid-spar 604 and the lower aft spar 606. The forward rib 614 and the aft rib 616 may be positioned under the structural skin 610. The third rib, the upper rib 618, may couple the lower primary airfoil 302 to the upper primary airfoil 304, while being further configured to define the vertical barrier between adjacent thrust assemblies 500. The upper rib 618 transfers moments from thrust line and upper aileron into the lower spars. The upper leading edge support 620 may be continuous or discontinuous through the center section, but pinned to the upper rib 618 at each rib station 626 to prevent local buckling from wing flexure. The upper leading edge supports 620 can be loaded as a hoop member from inlet loads. In certain aspects, the upper leading edge supports 620 may be fabricated as a single component encompassing the arced shape of multiple ducts.

The trailing edge control surfaces 406 may be actuated to adjust the thrust nozzle at each ducted fan, thereby controlling the roll, yaw, and pitch of the hybrid propulsion aircraft 100 through differential and/or vectored thrust. The trailing edge control surfaces 406 are split at each rib station 626 between adjacent thrust assemblies 500. The rib station 626 may be covered with a fairing to form the separator plate 408, thereby providing a hollow space that houses various controllers, sensors, conductors, etc. The trailing edge control surfaces 406 are held in place using a bearing and pillow block arrangement attached to the intersection of rib and aft spars. The various trailing edge control surfaces 406 may be ganged together using a torque tube 630. Actuators 628 are connected to one or more ribs at a rib station 626 (e.g., hidden in the space defined by the fairing). Each actuator 628 is coupled with a push arm 632, which is attached to a torque tube 630 for a given control surface 406. Thus, each control surface 406 may be separately and independently controlled by selectively actuating a given actuator 628.

Figure 7:
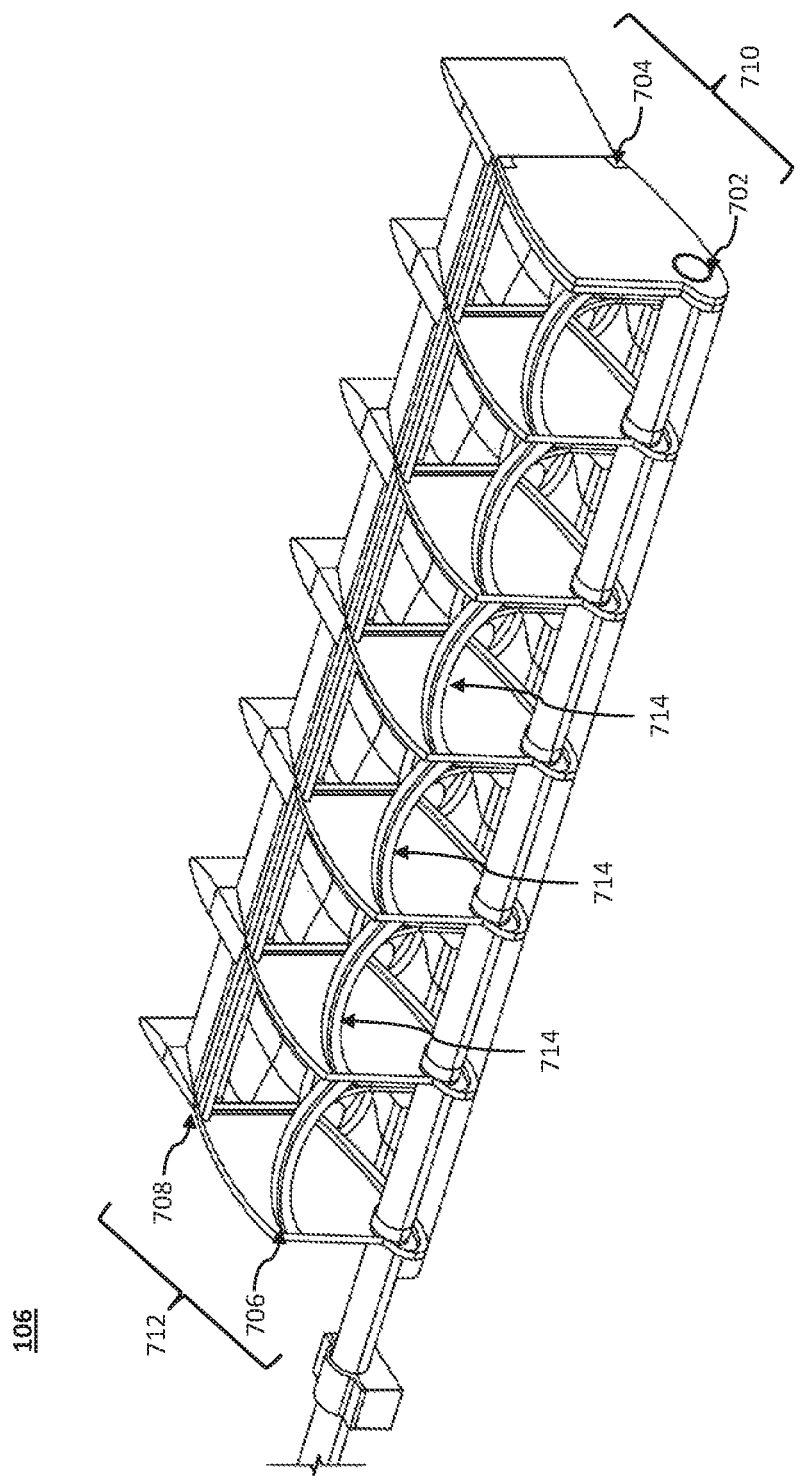
FIG. 7 illustrates an example structural layout of a canard wing.

FIG. 7 illustrates an example structural layout of a canard wing 106, which is structurally similar to the primary wing 104, but scaled down, therefore requiring fewer structural components. The lower canard airfoil 710 functions as the main structural component, and comprises a forward tube spar 702 and a lower aft spar 704. The upper canard airfoil 712 comprises an upper leading edge support 706 and an upper aft spar 708. The lower aft spar 704 and the upper aft spar 708 are discontinuous through the center section to facilitate mounting of trailing edge control surfaces 406 and stator blades 514. The upper canard airfoil 712 is pinned to a rib at each rib station to prevent local buckling from wing flexure. Structural skin may be provided on the upper and lower sides of lower canard airfoil 710, running continuously under the thrust assemblies 500. A canard rib 714 is positioned at each rib station (e.g., the area between each thrust assembly 500). The canard rib 714 couples the lower canard airfoil 710 to the upper canard airfoil 712, while being further configured to define a vertical barrier between adjacent thrust assemblies 500. The canard rib 714 transfers moments from thrust line and upper aileron into the lower spars. The trailing edge control surfaces 406 operate in substantially the same manner as discussed with regard to the primary wing 104 in FIG. 6c.

Figure 8:
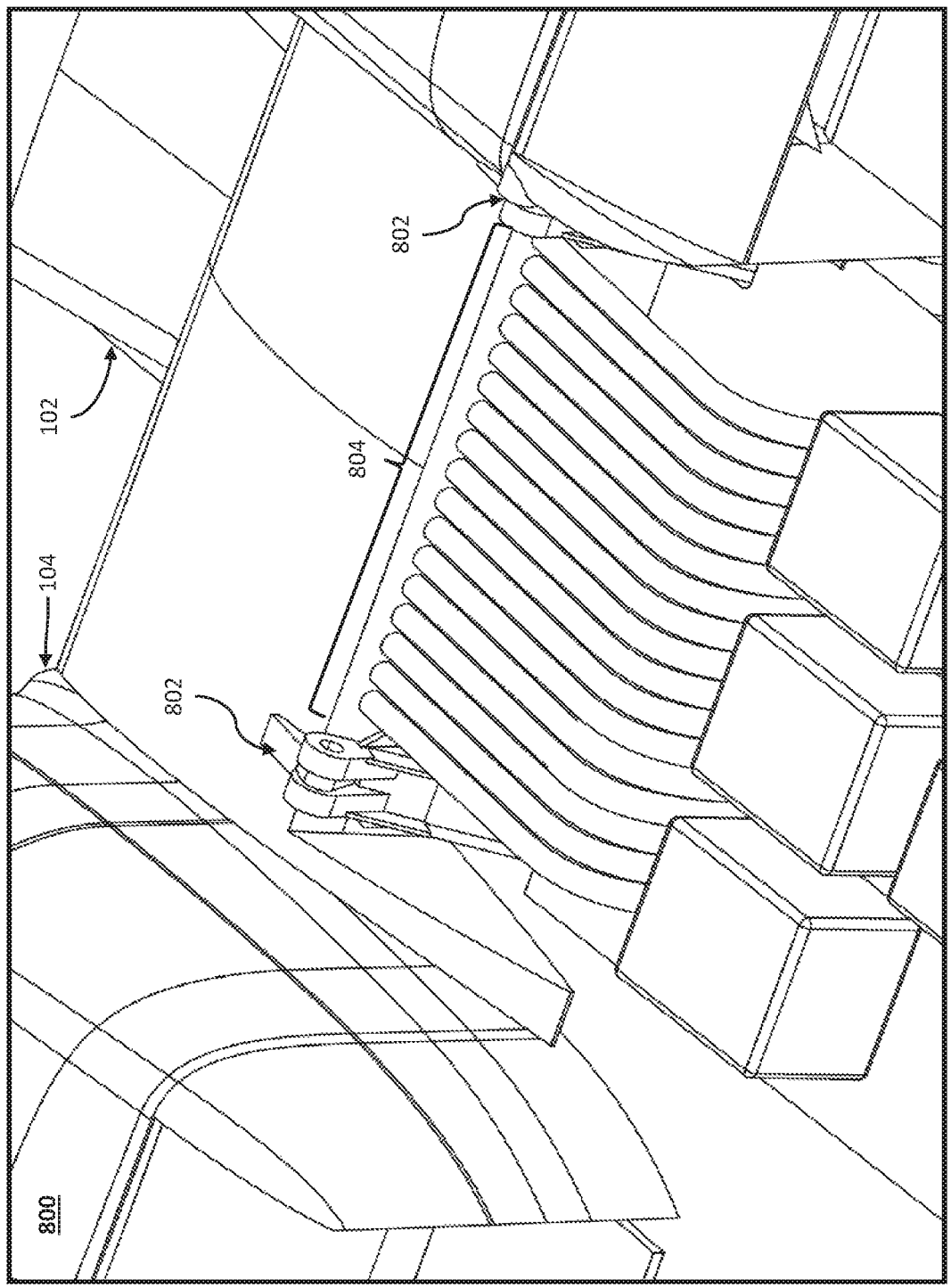
FIG. 8 illustrates an example primary wing pivot configuration.

FIG. 8 illustrates an example primary wing pivot configuration 800 for pivotally connecting the primary wing 104 to the fuselage 102. The primary wing 104 may be pivotally connected to the fuselage 102 using a plurality of pivotal connectors 802, which may be actuator-controlled. Suitable actuators include, without limitation, hydraulic actuators, electric actuators, or a hydraulic or electrically driven translating jackscrew. As illustrated, the various conductors 804 egress from the primary wing 104 at the mid-spar 604 close to the primary wing pivot point. The conductors 804 couple to the power distribution system via a conductor opening in the surface of the fuselage 102. Positioning the conductors 804 at the primary wing pivot point minimizes conductor sweep, thereby mitigating risk of damage to the conductors 804. In operation, the primary wing can rotate from a hover position to a horizontal flight position within 10 seconds or less.

Figure 9A:
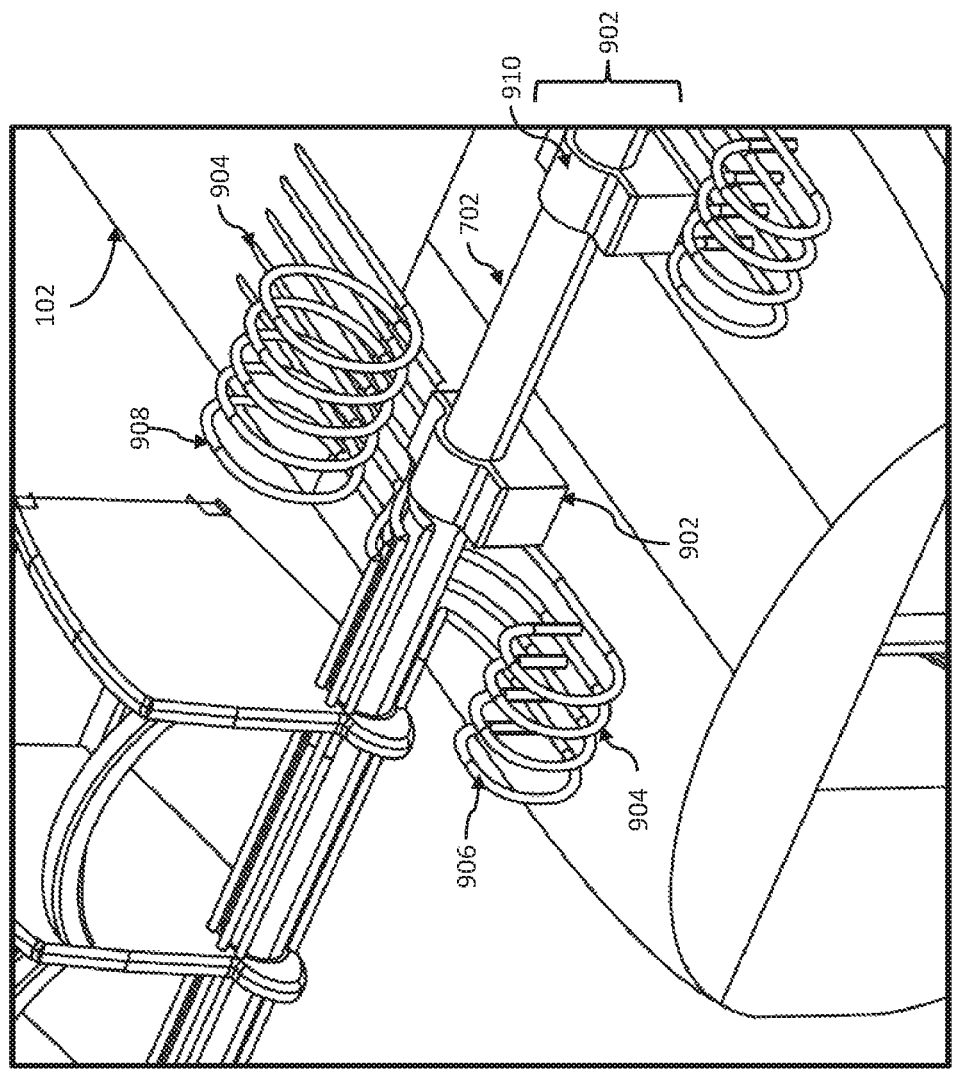
FIGS. 9a and 9b illustrate an example canard wing pivot configuration.
Figure 9B:
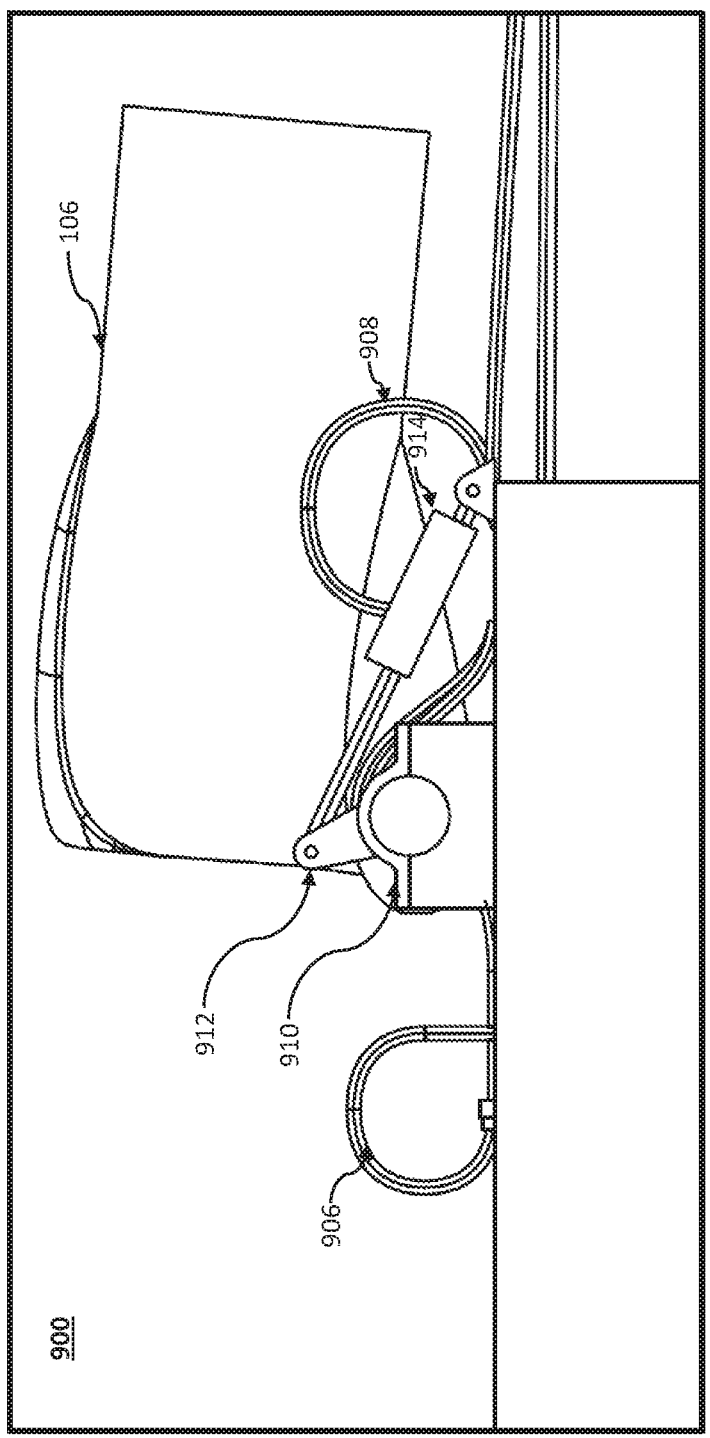

FIGS. 9a and 9b illustrate an example canard pivot configuration 900 for pivotally connecting the canard wing 106 to the fuselage 102. The canard wing 106 may be pivotally connected to the fuselage 102 using a plurality of pivotal connectors 902, which, like the pivotal connectors 802 of FIG. 8, may be actuator-controlled. For example, the pivotal connectors 902 may be pillow block bearing fittings 910 that attach forward tube spar 702 to the airframe of the fuselage 102. A linear actuator mechanism 914 rotates the canard wing's 106 forward tube spar 702 via a control horn 912. The conductors 904 may be arranged in service loops, which contract and expand in diameter as the forward tube spar 702 rotates. Such service loops mitigate kinking while preventing loose or unfastened cabling. For example, four forward service loops 906 and five aft service loops 908 may be positioned one each side of the forward tube spar 702. The conductors 904 may travel toward the aft end of the hybrid propulsion aircraft 100, where the conductors 904 may couple to the hybrid propulsion aircraft 100 through a single conductor opening, along with the conductors 804 for the primary wing 104, thereby minimizing the number of openings in the fuselage 102.

While each of the primary wings 104 and the two canard wings 106 are illustrated as pivoting in their entirety relative to the fuselage 102 (between the vertical wing configuration and the horizontal wing configuration), it is contemplated that only a portion of the primary wings 104 and/or the two canard wings 106 may pivot relative to the fuselage 102. For example, the primary wings 104 and/or the two canard wings 106 may be fabricated with a fixed wing portion (e.g., a fixed leading edge portion) and a hinged wing portion (e.g., a pivoting trailing edge portion where the hinge runs lengthwise like a flap) having positioned thereon the plurality of ducted fans 108, 110 to generate an aggregate thrust. In this example, the hinged wing portion would be controlled and pivoted to direct the aggregate thrust from the ducted fans 108 between the vertical wing configuration in hover mode and the horizontal wing configuration in horizontal flight mode. In certain aspects, each of the plurality of ducted fans 108 may be individually controlled in terms of thrust/speed, as well as pivot angle (relative to the wing 104 or other ducted fans 108). For example, each of the plurality of ducted fans 108, 110 may pivot relative to the fuselage 102 independently from one or more of the remaining ducted fans 108, 110.

Figure 10B:
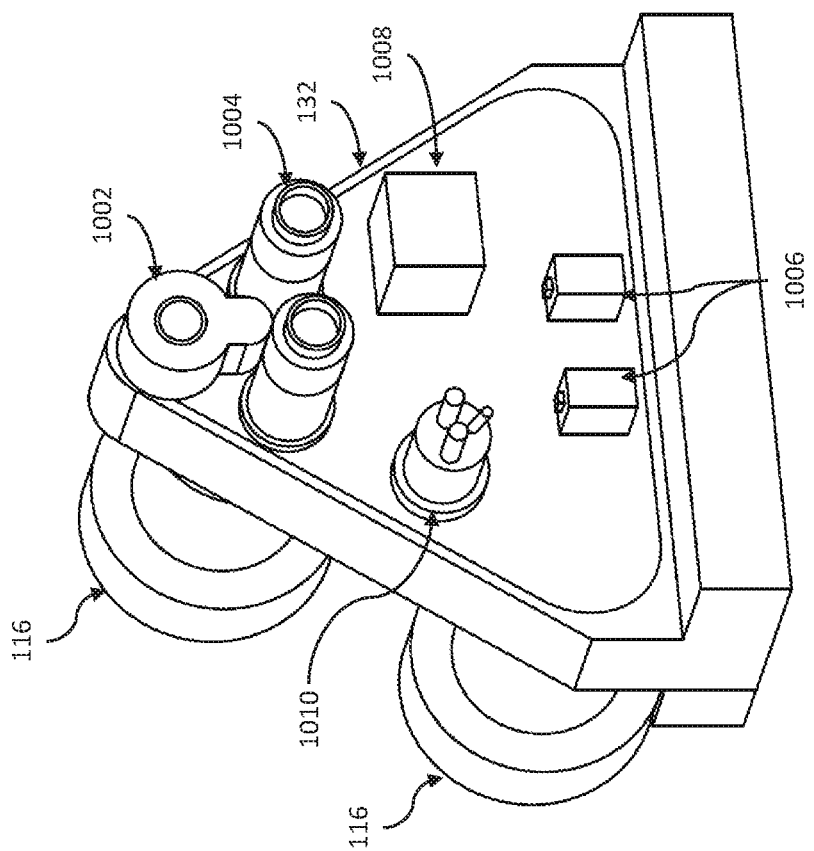
FIGS. 10a and 10b illustrate, respectively, front and rear isometric views of an example gearbox.
Figure 10A:
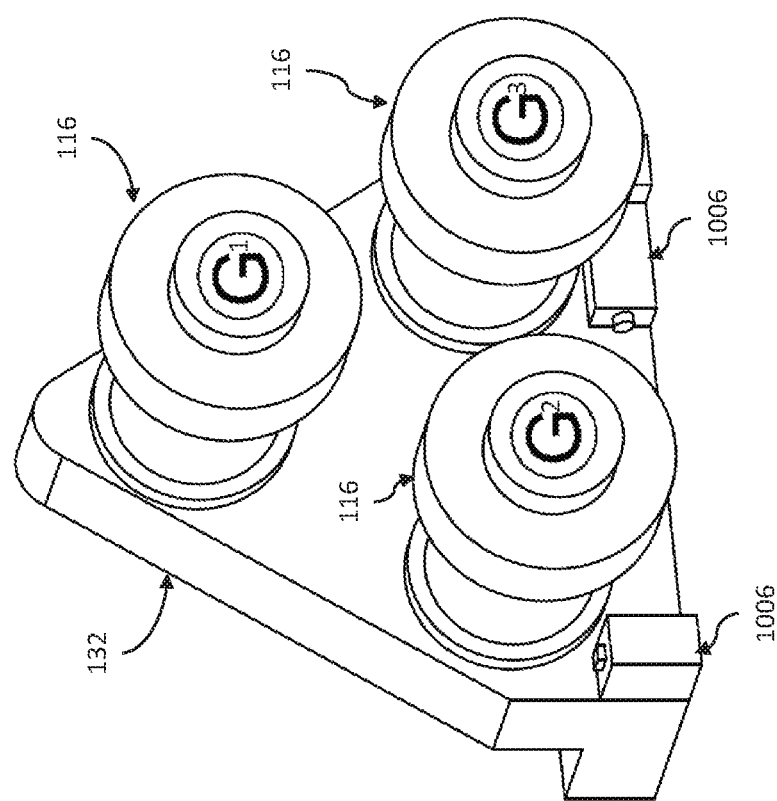

FIGS. 10a and 10b illustrate, respectively, front and rear isometric views of the gearbox 132 coupled with multiple primary generators 116, multiple auxiliary power generators 1004, one or more oil pumps 1008, and one or more hydraulic pumps 1010. In operation, the gearbox 132 receives a rotational input from the engine 112 via an input driveshaft 1002. The gearbox 132 allocates the rotational input to the plurality of primary generators 116, one or more auxiliary power generators 1004, and, when applicable, the oil pumps 1008 and the hydraulic pumps 1010. One or more generator control and synchronization units (GCSUs) 1006 are provided to provide basic control, monitoring, and protection of the three primary generators while also allowing for low speed startup and synchronization of motors to the generator. Other generator control units provide basic control, monitoring, and protection to the generator 116 and two auxiliary power generators 1004. The hydraulic pump 1010 may be used to operate the wing tilt actuators (e.g., for the primary wing 104 and canard wing 106), as well as the landing gear actuators, and brakes.

Figure 11:
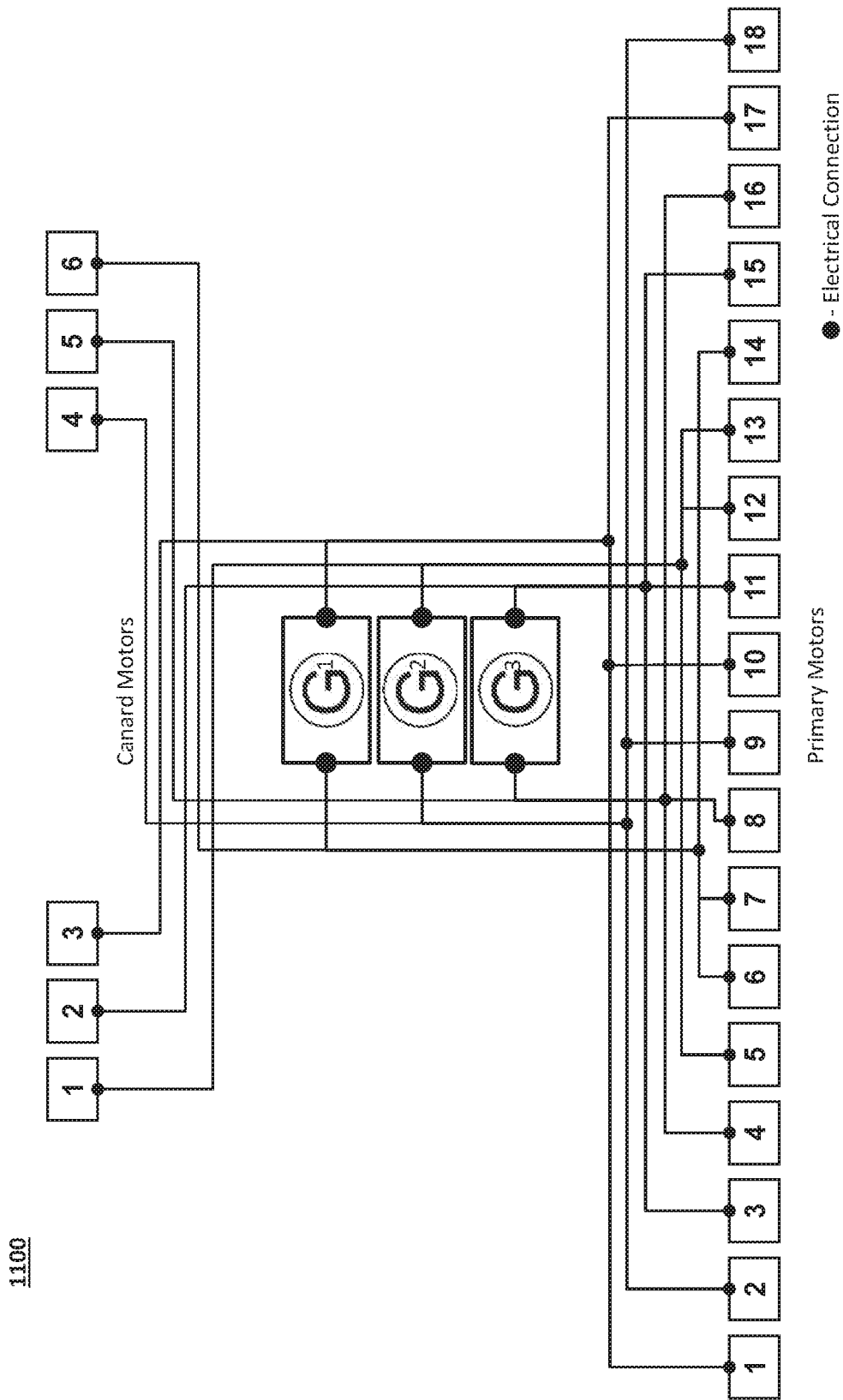
FIG. 11 illustrates an electrical mapping diagram of fan motors in a distributed propulsion arrangement.

FIG. 11 illustrates an electrical mapping diagram 1100 of fan motors 506 that allows for a sustainable asymmetric thrust in the event of a conductor or generator 116 failure. In other words, failure tolerance is accomplished by controlling the reallocation of power through distributed propulsion. As illustrated in the electrical mapping diagram 1100, in an arrangement having 18 primary ducted fans 108 and 6 canard ducted fans 110, each of the three primary generators 116 (i.e., G1, G2, G3) powers an equal number of equally distributed primary fan motors 506 (i.e., primary motors 1 through 18) and canard fan motors 506 (i.e., canard motors 1 through 6). That is, the fan motors 506 driven by a given generator are evenly distributed across a given wing's 104, 106 wingspan such that thrust is balanced on each side of the fuselage 102. For example, a first generator (G1) 116 may power canard motors 3 and 6, as well as primary motors 1, 6, 7, 10, 14, and 17. The remaining motors are evenly divided between second generator (G2) 116 and third generator (G3) 116. Specifically, the second generator (G2) 116 may power canard motors 1 and 4 and primary motors 2, 5, 9, 12, 13, and 18, while the third generator (G3) 116 may power canard motors 2 and 5 and primary motors 3, 4, 8, 11, 15, and 16. Thus, if any one of the first through third generators (G1-G3) 116 were to fail, the remaining motors would be evenly distributed and the hybrid propulsion aircraft 100 would remain balanced to mitigate any rolling moment. While not illustrated, the hybrid propulsion aircraft 100 may further comprise one or more battery banks to store power generated by the one or more generators 116. The one or more battery banks may be used to power the primary ducted fans 108 and/or the canard ducted fans in the event of engine 112 failure. The one or more battery banks may employ, for example, lithium iron phosphate batteries. As can be appreciated, AC power generated by the one or more generators 116 may first be converted to DC via a rectifier before being transferred to said one or more battery banks, in which case a motor controller or inverter can be used to drive the motor using the DC power.

In certain aspects, the ducted fans may employ counter-rotation ordering and loads. For example, one ducted fan may rotate clockwise, while the two adjacent ducted fans rotate counter-clockwise. Similarly, ducted fans positioned on one side of the fuselage 102 may counter-rotate with regard to the ducted fans positioned on the opposite side of the fuselage 102. While the example electrical mapping diagram 1100 employs 18 primary ducted fans 108 and 6 canard ducted fans 110, the same principles of maintaining an equal load and even distribution may be applied to countless arrangements having varying quantities of fan motors 506, such as the arrangement of FIG. 1a, which has 18 primary ducted fans 108 and 12 canard ducted fans 110.

Figure 12:
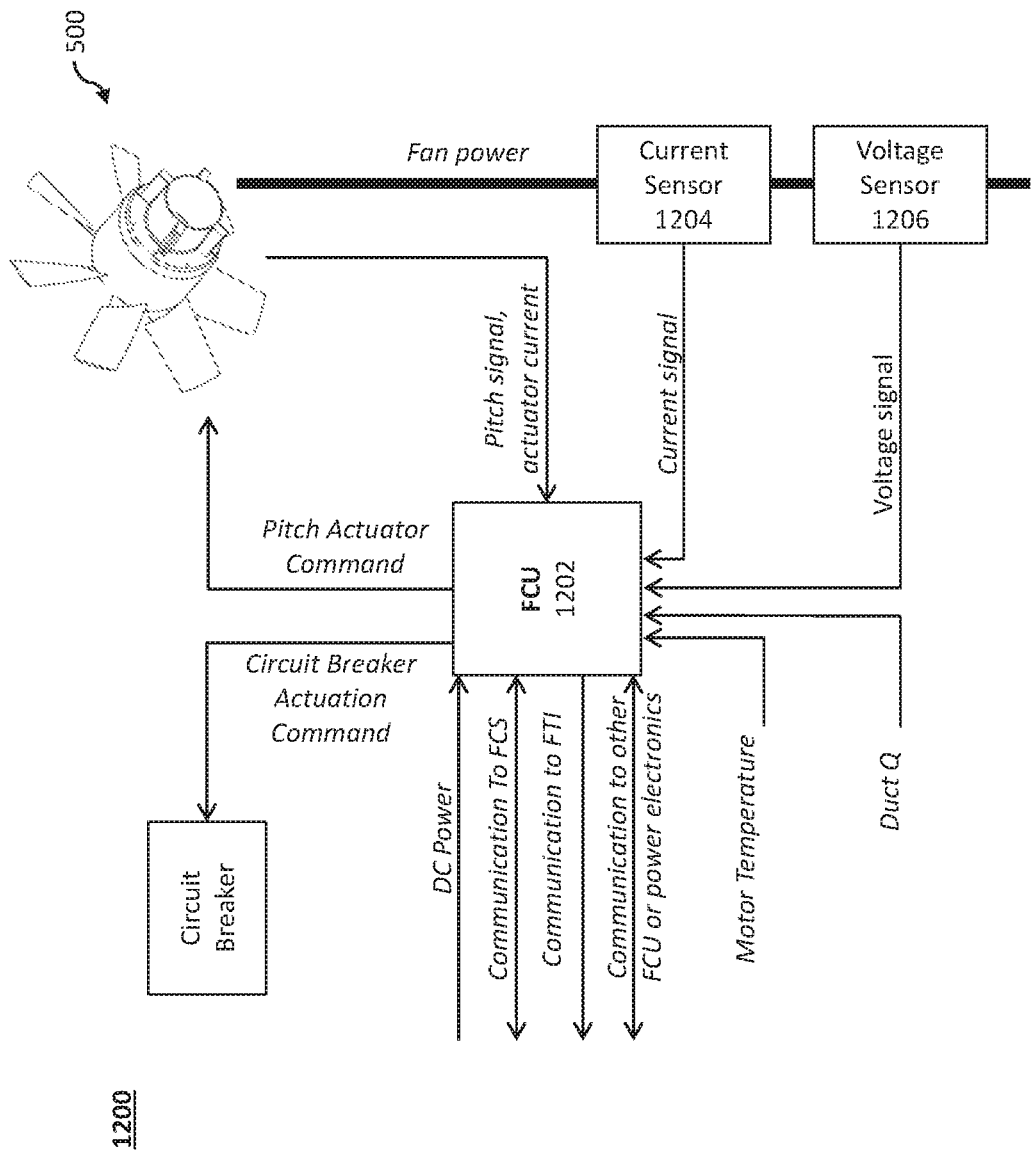
FIG. 12 illustrates a synchronization monitoring system having a flight control unit.

FIG. 12 illustrates a synchronization monitoring system 1200 having a flight control unit ("FCU") 1202 that prevents one fan motor 506 from falling out of synchronization with the other fan motors 506 and generator 116. In summary, the FCU 1202 detects whether a fan is, or will soon be, out of synchronization through, for example, torque or current detection, waveform analysis, and comparing the phase angles of two signals. Blade pitch may be adjusted to increase or decrease a given load on the fan motor 506, while a turbine speed regulator maintains constant speed. The FCU 1202 accomplishes this by monitoring the motor voltage (via voltage sensor 1206) and motor current (via current sensor 1204), closing the fan pitch loop to achieve the autopilot's commanded pitch, reducing pitch (and notifying the autopilot) if the torque approaches a predetermined limit, and providing fan motor parameters including, inter alia, current and voltage phasors, rotations per minute ("RPM"), fan speed, temperatures, pitch, etc. to the flight controller and/or GSCU 1006. Indeed, the phase angle between voltage and current may be used to predict loss of synchronization between the fan motor 506 and/or generator 116, thus enabling use of a low-risk, off the shelf hardware in lieu of custom hardware. Synchronization may be achieved by regulating the GCSU 1006 during low speed startup of the generator. For example, the FCU 1202 could configure the fan blades 512 with a flat pitch to reduce load on the motor 506 during startup. As the motors 506 begin to spin with the generator 116, the blade pitch can be gradually increased. In certain aspects, the load on the motor 506 may be increased with each RPM to provide a more stable and robust synchronization. The FCU may also control a circuit breaker or other electronic device to de-couple a motor (e.g., a malfunctioning or defective motor) from the bus to protect the system. Additionally, the FCU may provide command and control of various power electronics that augment the electrical operation of the fan ranging from start up through normal operation including the ability to provide modal damping, braking, or temporary power boosts from a secondary power bus.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A hybrid propulsion vertical take-off and landing (VTOL) aerial vehicle operable in a hover mode and a horizontal flight mode, the VTOL aerial vehicle comprising:
a fuselage;
an engine operatively coupled with one or more generators to generate electric power, wherein the engine and the one or more generators are positioned within the fuselage;
a primary wing set having a first wing and a second wing, the primary wing set having a first plurality of integrated ducted fans to collectively generate a first aggregate thrust, each of said first plurality of integrated ducted fans driven by an electric fan motor operatively coupled with at least one of said one or more generators, wherein at least two integrated ducted fans of said first plurality of integrated ducted fans are positioned on each of the first wing and the second wing; and
a canard wing set having a first canard wing and a second canard wing, the canard wing set having a second plurality of integrated ducted fans to collectively generate a second aggregate thrust, each of said second plurality of integrated ducted fans driven by an electric fan motor operatively coupled with at least one of said one or more generators,
wherein at least two integrated ducted fans of said second plurality of integrated ducted fans are positioned on each of the first canard wing and the second canard wing, and
wherein at least a portion of the primary wing set is configured to pivot relative to the fuselage between a vertical wing configuration to direct the first aggregate thrust downward in the hover mode and a horizontal wing configuration to direct the first aggregate thrust horizontally in the horizontal flight mode, wherein at least a portion of the canard wing set is configured to pivot relative to the fuselage between a vertical canard wing configuration to direct the second aggregate thrust downward in the hover mode and a horizontal canard wing configuration to direct the second aggregate thrust horizontally in the horizontal flight mode, and wherein the VTOL aerial vehicle is configured to (1) drive each of the first and second pluralities of integrated ducted fans at a constant rotational speed without inverting or converting a voltage or a frequency of the electric power and (2) independently adjust thrust from each of the first and second pluralities of integrated ducted fans via a pitch control mechanism while maintaining the constant rotational speed.

2. The hybrid propulsion VTOL aerial vehicle of claim 1, wherein at least one of the primary wing set and the canard wing set is anhedral.

3. The hybrid propulsion VTOL aerial vehicle of claim 1, wherein each of said first plurality of integrated ducted fans and said second plurality of integrated ducted fans comprises an adjustable thrust nozzle that is independently controllable to adjust a thrust vector from said integrated ducted fan.

4. The hybrid propulsion VTOL aerial vehicle of claim 1, wherein each of said first plurality of integrated ducted fans and said second plurality of integrated ducted fans is distributed evenly along a wingspan of the primary wing set or the canard wing set.

5. The hybrid propulsion VTOL aerial vehicle of claim 1, wherein the one or more generators include a first generator operably coupled with: (1) two of said first plurality of integrated ducted fans that are positioned on opposite sides of the fuselage; and (2) two of said second plurality of integrated ducted fans that are positioned on opposite sides of the fuselage.

6. The hybrid propulsion VTOL aerial vehicle of claim 5, wherein the one or more generators include the first generator and a second generator, the second generator operably coupled with: (1) two of said first plurality of integrated ducted fans that are positioned on opposite sides of the fuselage; and (2) two of said second plurality of integrated ducted fans that are positioned on opposite sides of the fuselage.

7. The hybrid propulsion VTOL aerial vehicle of claim 1, further comprising a gearbox, wherein said engine and each of said one or more generators are operably coupled with the gearbox without an intervening drive shaft.

8. The hybrid propulsion VTOL aerial vehicle of claim 1, wherein each of said first and second plurality of integrated ducted fans comprises a duct chamber having a thrust assembly positioned within the duct chamber, wherein the duct chamber defines an upper leading edge with one or more airflow slots to guide airflow through the upper leading edge and into the duct chamber.

9. The hybrid propulsion VTOL aerial vehicle of claim 8, wherein each thrust assembly comprises a fan having a plurality of fan blades and wherein the pitch control mechanism is configured to adjust a pitch of each of said plurality of fan blades.

10. The hybrid propulsion VTOL aerial vehicle of claim 9, wherein each of said plurality of fan blades comprises a pitch arm that is coupled with a translating pitch cone, wherein the translating pitch cone is configured to actuate each pitch arm by traveling laterally and perpendicularly in relation to a plane defined by rotation of the fan.

11. The hybrid propulsion VTOL aerial vehicle of claim 1, further comprising a flight control unit to detect whether a first electric fan motor of a first integrated ducted fan is out of synchronization with a second electric fan motor of a second integrated ducted fan using a torque detection technique or by comparing at least one of a phase or a waveform of a voltage signal and a current signal.

12. The hybrid propulsion VTOL aerial vehicle of claim 1, further comprising a flight control unit to provide direct feedback pertaining to an operating parameter of at least one of said first plurality of integrated ducted fans or said second plurality of integrated ducted fans to a generator controller operatively coupled with one or more of said one or more generators.

13. The hybrid propulsion VTOL aerial vehicle of claim 1, wherein each electric fan motor operates at a constant motor speed during a transition between said hover mode and said horizontal flight mode.

14. The hybrid propulsion VTOL aerial vehicle of claim 1, wherein each electric fan motor and each of the one or more generators operate at a constant rotation per minute (RPM) during a transition between said hover mode and said horizontal flight mode.

15. The hybrid propulsion VTOL aerial vehicle of claim 1, wherein each electric fan motor operates at a constant frequency during a transition between said hover mode and said horizontal flight mode.

16. The hybrid propulsion VTOL aerial vehicle of claim 1, wherein the electric power generated by said one or more generators is supplied to the first plurality of integrated ducted fans and the second plurality of integrated ducted fans without converting or inverting said electric power.

17. The hybrid propulsion VTOL aerial vehicle of claim 1, wherein the electric power generated by said one or more generators is filtered to remove noise and is supplied to the first plurality of integrated ducted fans and the second plurality of integrated ducted fans via a Litz wire or a metal tube having a varying diameter.

18. The hybrid propulsion VTOL aerial vehicle of claim 1, wherein the primary wing set is modular such that one or more of the first plurality of integrated ducted fans is a ducted fan module configured to removably couple with an adjacent integrated ducted fan.

19. A vertical take-off and landing (VTOL) aerial vehicle operable in a hover mode and a horizontal flight mode, the VTOL aerial vehicle comprising:
a fuselage;
a first primary wing coupled to the fuselage and having a first plurality of independently-controllable integrated ducted fans,
wherein the first plurality of integrated ducted fans is configured to pivot relative to the fuselage in unison between a first position to direct thrust downward in the hover mode and a second position to direct thrust horizontally in the horizontal flight mode;
a second primary wing coupled to the fuselage and having a second plurality of independently-controllable integrated ducted fans,
wherein the second plurality of integrated ducted fans is configured to pivot relative to the fuselage in unison between a first position to direct thrust downward in the hover mode and a second position to direct thrust horizontally in the horizontal flight mode;
a first canard wing coupled to the fuselage and having a third plurality of independently-controllable integrated ducted fans, wherein the third plurality of integrated ducted fans is configured to pivot relative to the fuselage in unison between a first position to direct thrust downward in the hover mode and a second position to direct thrust horizontally in the horizontal flight mode; and a second canard wing coupled to the fuselage and having a fourth plurality of independently-controllable integrated ducted fans, wherein the fourth plurality of integrated ducted fans is configured to pivot relative to the fuselage in unison between a first position to direct thrust downward in the hover mode and a second position to direct thrust horizontally in the horizontal flight mode, and wherein the VTOL aerial vehicle is configured to (1) drive each of the first and second pluralities of integrated ducted fans at a constant rotational speed using electric power without inverting or converting a voltage or a frequency of the electric power and (2) independently adjust thrust from each of the first and second pluralities of integrated ducted fans via a pitch control mechanism while maintaining the constant rotational speed.

20. A hybrid propulsion vertical take-off and landing (VTOL) aerial vehicle operable in a hover mode and a horizontal flight mode, the VTOL aerial vehicle comprising:

a fuselage;

an engine operatively coupled with a gearbox;

one or more generators operatively coupled with the gearbox and configured to generate alternating current (AC) electric power at a voltage and a frequency;

a primary wing set having a first wing and a second wing, the primary wing set having a first plurality of integrated ducted fans, wherein at least two integrated ducted fans of said first plurality of integrated ducted fans are positioned on each of the first wing and the second wing, wherein at least a portion of the primary wing set is configured to pivot the first plurality of integrated ducted fans relative to the fuselage between a hover position and a cruise position;

a canard wing set having a first canard wing and a second canard wing, the canard wing set having a second plurality of integrated ducted fans, wherein at least two integrated ducted fans of said second plurality of integrated ducted fans are positioned on each of the first canard wing and the second canard wing, wherein at least a portion of the canard wing set is configured to pivot the second plurality of integrated ducted fans relative to the fuselage between a hover position and a cruise position; and a flight control unit operably coupled with each of the first plurality of integrated ducted fans and the second plurality of integrated ducted fans, wherein the flight control unit is configured to (1) drive each of the first and second pluralities of integrated ducted fans at a constant rotational speed without inverting or converting the voltage or the frequency of the AC electric power and (2) independently adjust thrust from each of the first and second pluralities of integrated ducted fans via a pitch control mechanism while maintaining the constant rotational speed.

\* \* \* \* \*